(12) United States Patent
Calvetti et al.

(10) Patent No.: US 10,157,151 B2
(45) Date of Patent: Dec. 18, 2018

(54) SYSTEM AND METHOD OF DETERMINING MEMORY ACCESS TIME

(71) Applicant: STMicroelectronics S.r.I, Agrate Brianza (IT)

(72) Inventors: Emanuela Calvetti, Villa d'adda (IT); Marcella Carissimi, Treviolo (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 111 days.

(21) Appl. No.: 15/297,897

(22) Filed: Oct. 19, 2016

(65) Prior Publication Data

US 2018/0107612 A1   Apr. 19, 2018

(51) Int. Cl.
*G06F 13/16* (2006.01)
*G06F 13/364* (2006.01)
*G06F 13/42* (2006.01)

(52) U.S. Cl.
CPC ........ *G06F 13/161* (2013.01); *G06F 13/1689* (2013.01); *G06F 13/364* (2013.01); *G06F 13/4291* (2013.01)

(58) Field of Classification Search
CPC .. G06F 13/1689; G06F 13/161; G06F 13/364; G06F 13/4291
See application file for complete search history.

(56) References Cited

U.S. PATENT DOCUMENTS 9,432,298 B1 *   8/2016   Smith ................. H04L 49/9057

OTHER PUBLICATIONS

Sharma, Ashok K., "Semiconductor Memories—Technology, Testing, and Realiability," IEEE Press, Chapter 5, pp. 212-213, Sep. 2002.

* cited by examiner

*Primary Examiner* — Ernest Unelus
(74) *Attorney, Agent, or Firm* — Slater Matsil, LLP

(57) ABSTRACT

An embodiment method includes storing, in each of a first plurality of memory locations of a memory, an address of another of the first plurality of memory locations, and reading, from a bus signal received at the memory, an address of a first one of the first plurality of memory locations. The method further includes reading data stored in the first one of the first plurality of memory locations, and determining, using the read data, whether a read error has occurred.

23 Claims, 11 Drawing Sheets

|  | Col 1 | Col 2 | ... | Col (M-1) | Col M |
|---|---|---|---|---|---|
| Row 1 | 0x00000010 | 0xFFFFFFFF | 0xFFFFFFFF | 0xFFFFFFFF | 0xFFFFFFFF |
| Row 2 | 0x00000020 | 0xFFFFFFFF | 0xFFFFFFFF | 0xFFFFFFFF | 0xFFFFFFFF |
| ... | ... | ... | ... | ... | ... |
| Row N | 0x00000000 | 0xFFFFFFFF | 0xFFFFFFFF | 0xFFFFFFFF | 0xFFFFFFFF |

SYSTEM AND METHOD OF DETERMINING MEMORY ACCESS TIME

TECHNICAL FIELD

The present disclosure relates generally to memory, and, in particular embodiments, to a system and method of determining access time of a memory.

BACKGROUND

In computing systems, memory latency or access time may be the time between initiating a request for data to be read or written until the data is retrieved from or written into memory. As such, access time may indicate how quickly a given memory can provide or write data. Access time is an important parameter, and a short access time can allow more aggressive timings in a computing system, which can lead to faster speeds and better performance.

Memory can be tested to determine its access time. The determined access time may, in some cases, be compared with a threshold access time to determine whether the given memory can meet the threshold access time. If timings in the computing system are set too aggressively (e.g. due to an incorrect determination of the memory's access time), computing system errors can occur because the memory may not be capable of providing data fast enough to other elements of the computing system. As such, efficient, accurate, and simplified methods of determining and verifying access time may be needed.

SUMMARY

In an embodiment, a method may include storing, in each of a first plurality of memory locations of a memory, an address of another of the first plurality of memory locations; reading, from a bus signal received at the memory, an address of a first one of the first plurality of memory locations; reading data stored in the first one of the first plurality of memory locations; and determining, using the read data, whether a read error has occurred.

In an embodiment, a method may include receiving an indication that an access time of a memory is to be determined; sampling, in response to the memory receiving a read command, a first address from a bus signal received at the memory, the first address being an address of a first one of a first plurality of memory locations; and reading data stored at the first one of the first plurality of memory locations. The method may further include determining whether the read data comprises correct data; determining whether a subsequent read operation is to be performed in response to a determination that the read data comprises the correct data; and reading data stored at the address of a further memory location in response to a determination that the subsequent read operation is to be performed.

In an embodiment, a circuit may include a plurality of storage elements configured to store, in each of a first plurality of memory locations, an address of another of the first plurality of memory locations; an address sampling circuit coupled to the plurality of storage elements and configured to provide an address to the plurality of storage elements; and a controller coupled to the plurality of storage elements and the address sampling circuit, the controller configured to control an operation of the address sampling circuit based on a determination of whether a read error has occurred.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 shows a simplified representation of data stored in the array of memory cells of the memory shown in FIG. 5, in accordance with an embodiment;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Memory and systems and methods of determining the access time of memory are provided in accordance with various embodiments. Some embodiments may achieve advantages. Embodiments provide a simplified, yet accurate and reliable, determination of the access time of memory since a single clock source is used in the determination. As such, there is no need to rely on relative time delays between different clock signals to determine the access time, and the limits of the access time may be investigated by merely increasing the frequency of the single clock source. Embodiments provide a way of determining the access time that is embedded in the memory and is independent of external logic. As such, the access time of a memory may be determined when the memory is in application or in an end-user product. Embodiments provide a system and method that circumvents having to sample, at high frequencies, data outputted by a memory in order to determine whether a memory error has occurred or not. Rather, in the described embodiments, data outputted from the memory may be sampled and checked after a finite state machine stops the determination of the access time.

Figure 1:
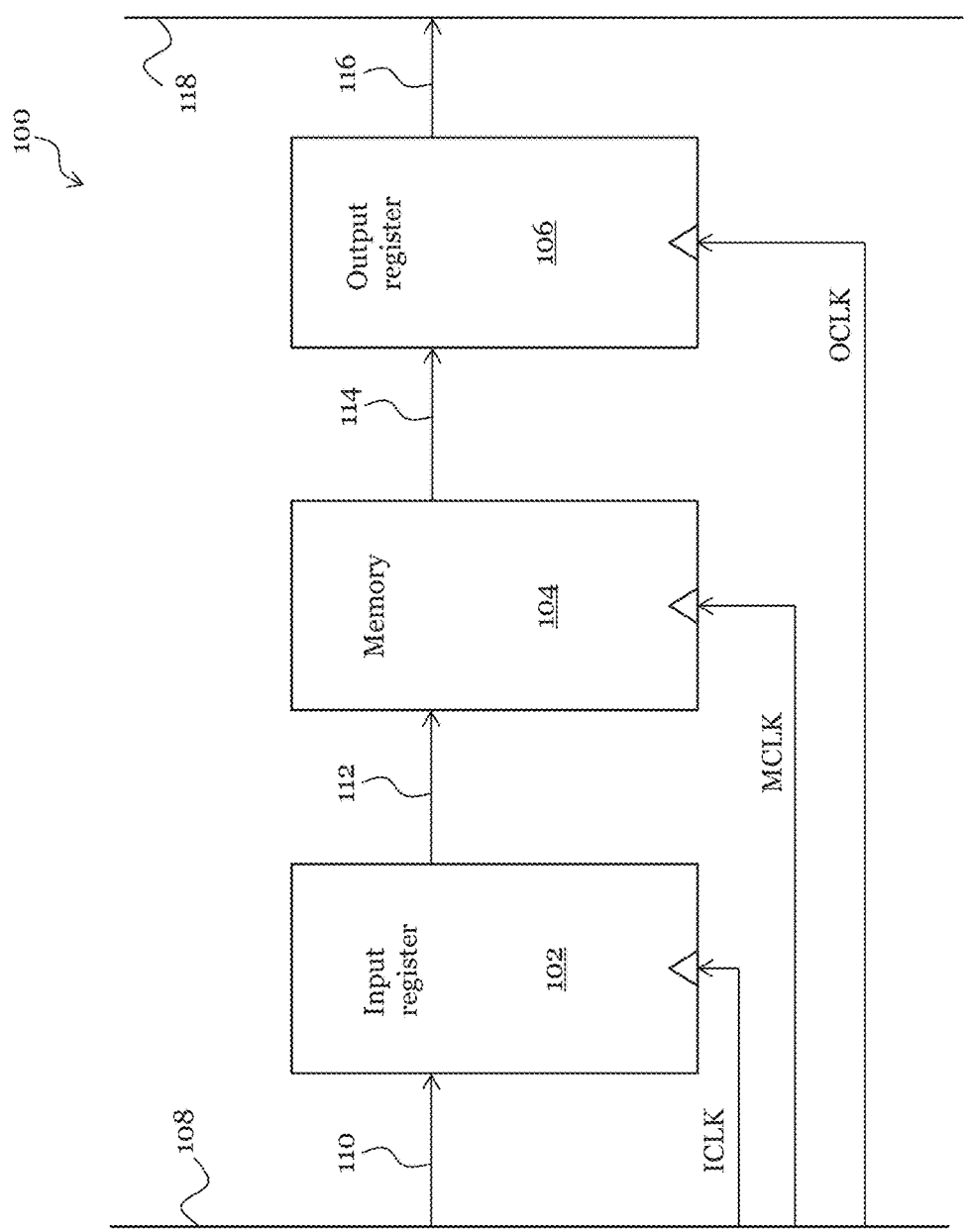
FIG. 1 shows a block diagram of a system, including an input register, a memory, and an output register.

FIG. 1 shows a block diagram of a system 100 for determining an access time of a memory. As shown in FIG. 1, the system 100 includes an input register 102, a memory 104, and an output register 106. In some embodiments, memory 104 may be a random access memory (RAM), a read-only memory (ROM), a phase change memory (PCM), combinations thereof, or the like. System 100 may be a conventional memory test configuration in which the access time of memory 104 is determined or verified by external test equipment. The external test equipment may include input register 102 and output register 106. As such, in system 100 shown in FIG. 1, input register 102 and output register 106 may be modules separate or distinct from memory 104.

As shown in FIG. 1, input register 102, memory 104, and output register 106 are each connected to an input bus 108. Input bus 108 may be included in the external test equipment used to determine the access time of memory 104. As shown in the example of FIG. 1, input register 102 receives memory command information no from input bus 108. Memory command information no may include an address pad block, one or more addresses of memory 104 to be accessed, information for a write command, information for a read command, combinations thereof, or the like. Input register 102 also receives an input register clock signal ICLK, while memory 104 receives a memory clock signal MCLK, and output register 106 receives an output register clock signal OCLK. The clock signals ICL, MCLK, and OCLK may be provided using input bus 108, as depicted in FIG. 1. As shown in FIG. 1, an output of input register 102 (indicated in FIG. 1 as latched memory command information 112) is provided as an input to memory 104; an output 114 of memory 104 is provided as an input to output register 106; and an output 116 of output register 106 is provided to an output bus 118. Output bus 118 may be included in the external test equipment used to determine the access time of memory 104. In the description that follows, the operation of system 100 is described in conjunction with FIG. 2.

Figure 2:
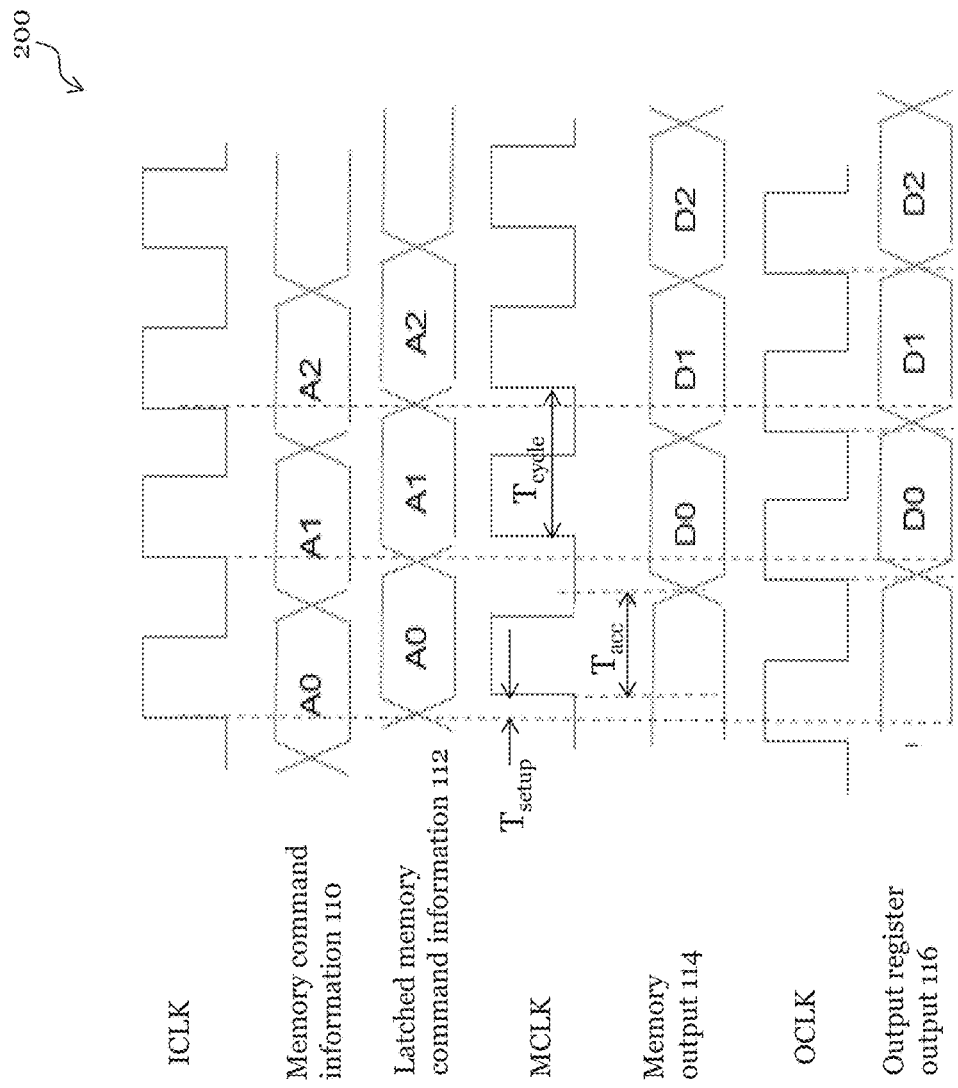
FIG. 2 shows a simplified timing diagram for the system shown in FIG. 1.

FIG. 2 shows a simplified timing diagram 200 for system 100 shown in FIG. 1. In the example of FIG. 2, it is assumed that memory command information no on input bus 108 includes information for a read command as well as an address pad block including addresses of memory 104 to be accessed. In the example of FIG. 1, the addresses of memory 104 to be accessed are depicted pictorially as A0, A1, A2, and so on. Additionally, data stored at addresses A0, A1, A2, and so on are depicted pictorially as D0, D1, D2, and so on, respectively.

Referring to FIGS. 1 and 2, input register 102 receives, as inputs, memory command information no and input register clock signal ICLK. In response to receiving memory command information no and input register clock signal ICLK, input register 102 latches memory command information no at a rising edge of input register clock signal ICLK (e.g. after a setup time of input register 102). The memory command information that is latched is provided to memory 104 as latched memory command information 112.

Figure 3:
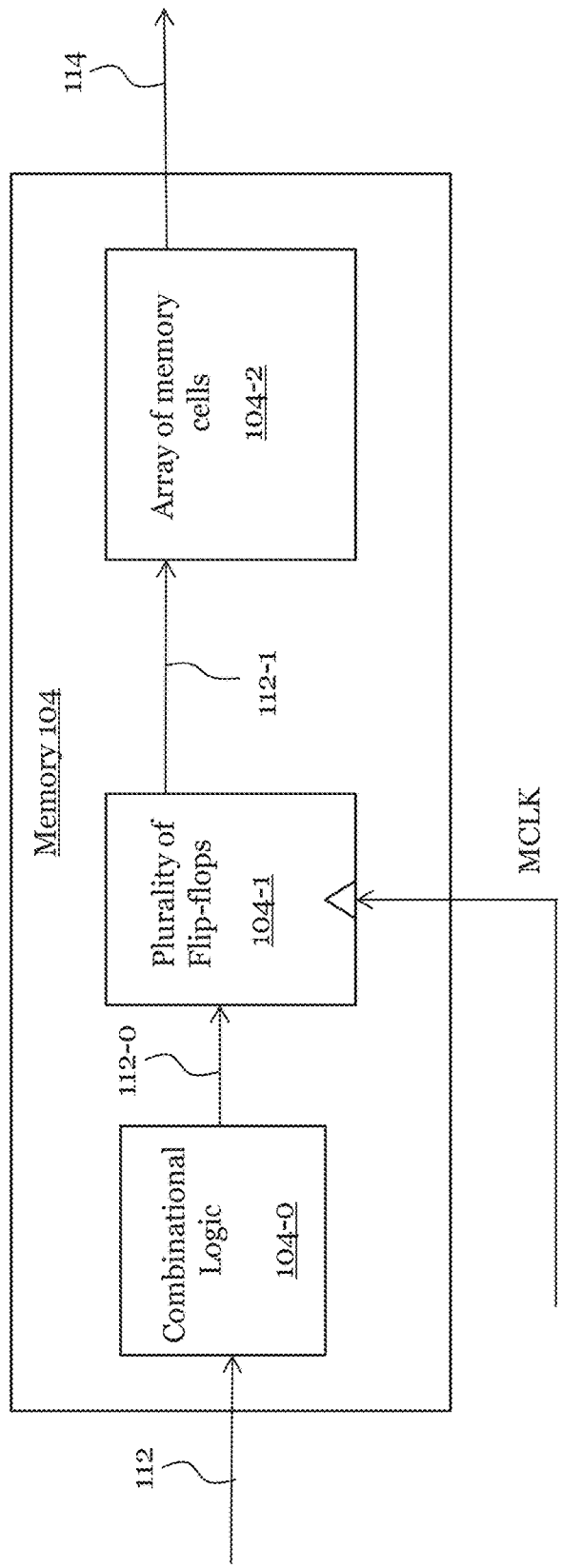
FIG. 3 shows a simplified block diagram of memory included in the system shown in FIG. 1.

Memory 104 receives, as inputs, latched memory command information 112 and memory clock signal MCLK. In some examples, the setup time of input register 102 (indicated in FIG. 2 as "$T_{setup}$") may be, or may be represented by or related to, a time delay between input register clock signal ICLK and memory clock signal. FIG. 3 shows a simplified block diagram of memory 104, in accordance with an example. As shown in FIG. 3, memory 104 may include a plurality of flip-flops 104-1 and an array of memory cells 104-2 (e.g. also referred to as "storage elements") in which data is stored. The array of memory cells 104-2 may include an array of RAM cells, an array of ROM cells, an array of PCM cells, combinations thereof, or the like. The array of memory cells 104-2 may include a plurality of rows, in which each row includes a plurality of memory cells. Each of the plurality of memory cells may include a memory element configured to stored data. In an embodiment where memory 104 is PCM memory, memory 104 may additionally include combinational logic 104-0, as shown in FIG. 3. Combinational logic 104-0 may be configured to decode latched memory command information 112 to produce a pre-decoded memory address 112-0, which is subsequently provided to the plurality of flip-flops 104-1.

Memory clock signal MCLK and pre-decoded memory addresses 112-0 may be provided to the plurality of flip-flops 104-1 of memory 104, as shown in FIG. 3. A rising edge of memory clock signal MCLK may initiate the read command of the latched memory command information 112. In an example where latched memory command information 112 includes addresses of memory 104 to be accessed (e.g. addresses A0, A1, A2, and so on, as depicted in FIG. 2), the plurality of flip-flops 104-1 may be configured to sample pre-decoded memory addresses 112-0 and to provide the sampled pre-decoded addresses 112-1 to the array of memory cells 104-2. As such, the plurality of flip-flops 104-1 may be referred to as an address sampling circuit. In an example where each of the addresses of memory 104 is a 16-bit memory address, the plurality of flip-flops 104-1 may include 16 flip-flops configured to sample the 16-bit pre-decoded memory address 112-0.

Memory access occurs whenever data is read from or written into memory 104 (e.g. the array of memory cells 104-2 of memory 104). Referring to FIG. 3, the sampled pre-decoded addresses 112-1 is provided to the array of memory cells 104-2 and data is read from or written into the array of memory cells 104-2. The amount of time it takes for memory 104 (e.g. the array of memory cells 104-2) to produce the data (e.g. in the case of a read operation) or write the data (e.g. in the case of a write operation) may be referred to as the access time of memory 104 (indicated in FIG. 2 as "$T_{acc}$"). As shown in FIG. 2, the access time $T_{acc}$ may be, or may be represented by or related to, a time between the start of the access (e.g. at the rising edge of memory clock signal MCLK) and a time when valid data is available for sampling and readout (e.g. shown in FIG. 2 as the time when output data Do is available for sampling and readout). In some embodiments, the access time $T_{acc}$ may be between about 5 nanoseconds to about 70 nanoseconds. The data D0, D1, D2, and so on, are provided as memory output 114 to output register 106.

As shown in the example of FIG. 2, for a read operation, the timing of output register clock signal OCLK is configured such that a rising edge of output register clock signal OCLK occurs at a time as close as possible to the time memory 104 completes the read operation. In other words, output register clock signal OCLK may be offset from memory clock signal MCLK by the access time $T_{acc}$. Stated in yet another way, respective rising edges of output register clock signal OCLK may be aligned with the time when respective output data Di is available for sampling and readout, where i=0, 1, 2, 3, and so on.

In response to output register 106 receiving output register clock signal OCLK and memory output 114, output register 106 latches the read data (e.g. memory output 114) at a rising edge of output register clock signal OCLK. The latched read data is outputted, by output register 106, as output register output 116, which can be read out using output bus 118. It may be observed from FIG. 2 that in the event that output register clock signal OCLK is offset from memory clock signal MLCK by less than the access time $T_{acc}$, incorrect data may be latched by output register 106 onto output bus 118. Erroneous latching of data onto output bus 118 may be indicative of a memory error.

In order to determine access time $T_{acc}$ for memory 104, output register clock signal OCLK is initially offset from memory clock signal MCLK by a relatively high amount. As an example, the initial offset may be set to be in a range from about 10 nanoseconds to about wo nanoseconds. As another example, the initial offset may be set to be between about 5 percent and about 50 percent of a time between consecutive rising edges in memory clock signal MCLK (which may be referred to as the "period" of memory clock signal MCLK). In essence, the initial offset may be a delay between memory clock signal MCLK and output register clock signal OCLK that is greater than an anticipated access time or a threshold access time. The time delay between output register clock signal OCLK and memory clock signal MCLK is subsequently decreased, such that rising edges of output register clock signal OCLK are moved closer, in time, to the rising edges of memory clock signal MCLK. The time delay between output register clock signal OCLK and memory clock signal MCLK is decreased in increments until a memory error occurs. As mentioned above, the occurrence of memory errors is indicative of output register 106 latching incorrect data, e.g. due to the offset between output register clock signal OCLK and memory clock signal MCLK being less than the access time $T_{acc}$ of memory 104. As such, the access time $T_{acc}$ of memory 104 may be determined or estimated as being the smallest time delay between output register clock signal OCLK and memory clock signal MCLK that avoids memory errors.

For a read operation, when data provided by output register output 116 onto output bus 118 are valid (e.g. when no memory errors occur), memory command information no cannot be changed immediately to start another read operation. This is because memory 104 needs a certain amount of time, called a read recovery time, to complete its internal operations before a subsequent access to the array of memory cells 104-2. The sum of the access time $T_{acc}$ and the read recovery time is sometimes referred to as a read cycle time (indicated in FIG. 2 as "$T_{cycle}$"), which may be, or may be represented by or related to, the period of memory clock signal MCLK.

As described above, the access time $T_{acc}$ of memory 104 may be determined using circuitry external to memory 104. For example, the above-described method of determining the access time $T_{acc}$ may be performed using automatic test equipment (ATE) or other types of equipment, where memory 104 is driven by circuitry external to or not included in memory 104. The external circuitry may include a register (e.g. input register 102) that receives at least one of memory command information no or control signals. The external circuitry may also include a data register (e.g. output register 106) that may also be used to sample output data from memory 104. However, using external circuitry to determine access time $T_{acc}$ of memory 104 may pose several disadvantages.

Firstly, external logic suitable for determining access time $T_{acc}$ may not be included in an end-user product. Thus, it may not be possible or feasible to determine, verify, or characterize the access time $T_{acc}$ when memory 104 is in application or in an end-user product. Secondly, as shown in FIG. 2, output register output 116 is provided onto output bus 118 at a frequency comparable to memory clock signal MCLK, and, output bus 118 is sampled at a frequency comparable to the frequency of memory clock signal MCLK, e.g. in order to determine whether a memory error has occurred. However, it may be difficult to sample output bus 118 at the desired frequency as memory clock signal MCLK frequencies increase with advancing technology. The above-described method of determining access time $T_{acc}$ also relies on clock signals ICLK, MCLK, OCLK having a controllable phase shift between them (e.g. where the time delay between clock signals MCLK and OCLK is decreased in increments until memory errors begin occurring). However, it may be difficult to control, with precision, the phase shift between clock signals ICLK, MCLK, OCLK, and this may result in uncertainty in the determined access time $T_{acc}$.

In view of the disadvantages associated with system wo and the associated method of determining access time $T_{acc}$, it may be desirable to provide a simplified, yet accurate and reliable, method and system of determining of the access time of memory without having to rely on relative time delays between different clock signals. It may also be desirable to provide a method and system of determining of the access time of memory that is independent of external logic. It may also be desirable to provide a method and system of determining of the access time of memory that circumvents having to sample, at high frequencies, data outputted by a memory in order to determine whether a memory error has occurred or not.

Figure 4:
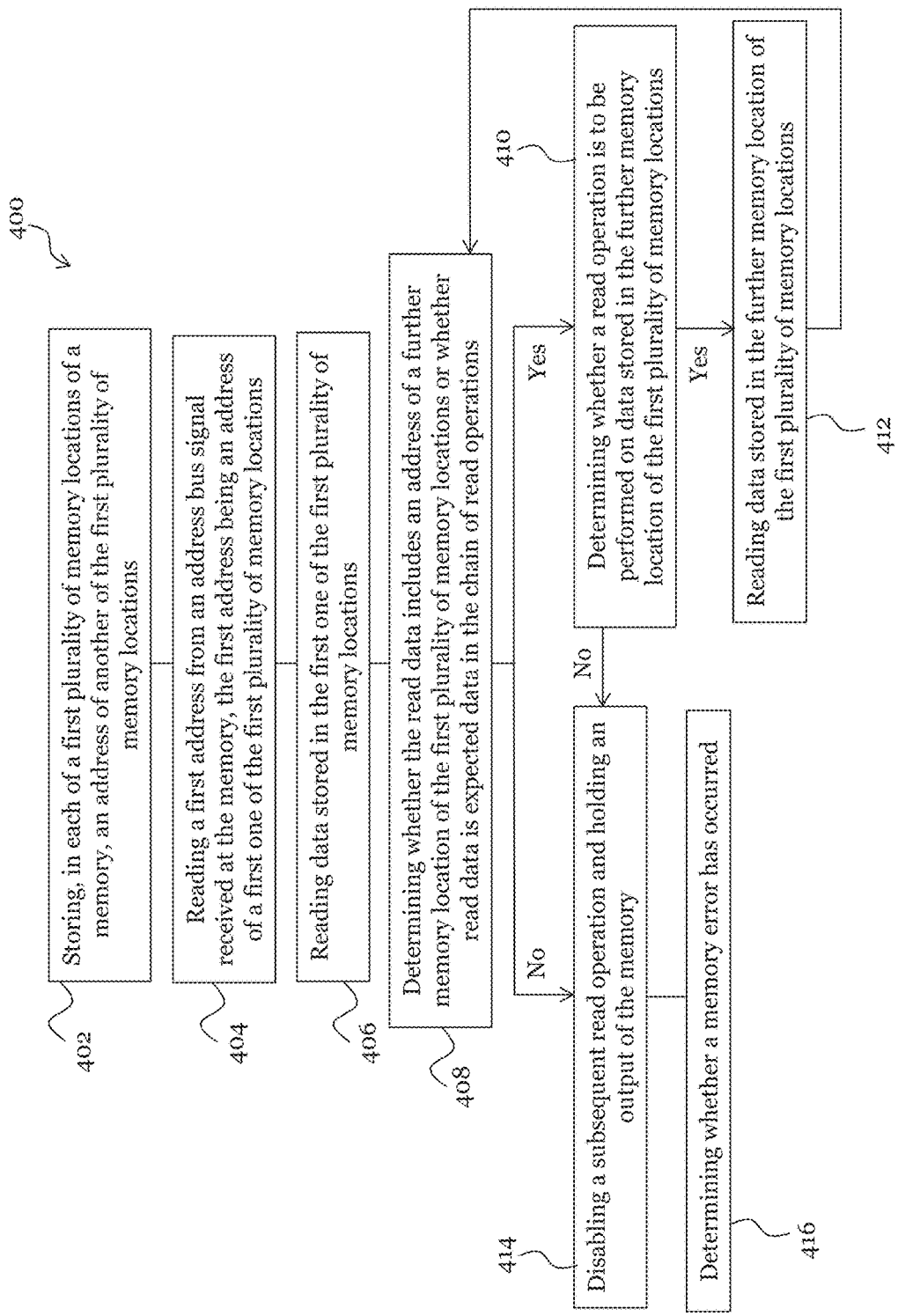
FIG. 4 shows a method of determining the access time of a memory, in accordance with an embodiment.

FIG. 4 shows a method 400 of determining the access time $T_{acc}$ of a memory, in accordance with an embodiment. Method 400 may be performed by a given memory to determine the access time $T_{acc}$ of the given memory. In comparison to the method described above in respect of FIGS. 1 to 3, method 400 determines the access time $T_{acc}$ of a given memory without having to rely on relative time delays between different clock signals. Method 400 also determines the access time $T_{acc}$ of a given memory independent of external logic. Method 400 also determines the access time $T_{acc}$ of a given memory by circumventing having to sample, at high frequencies, data outputted by a memory in order to determine whether a memory error occurred or not.

Figure 5:
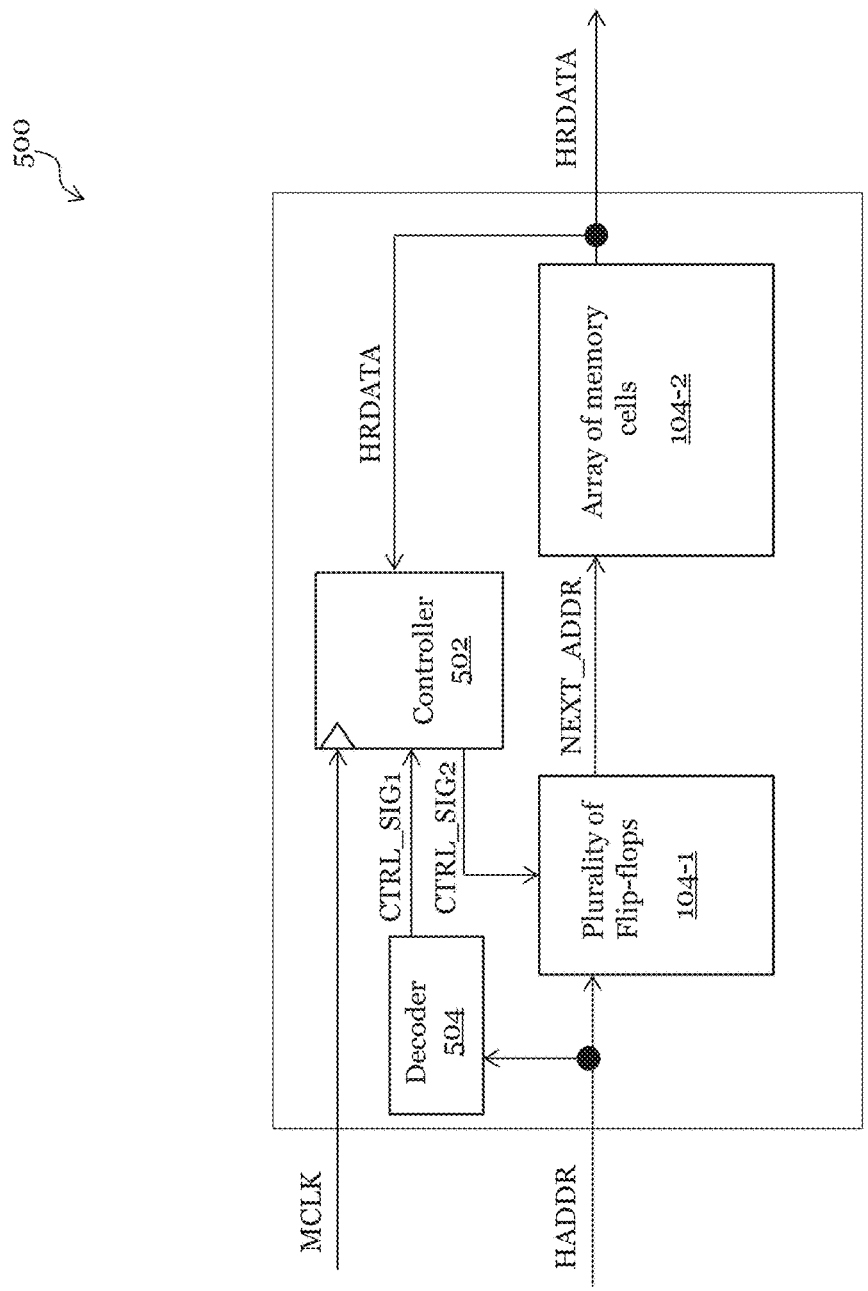
FIG. 5 shows a simplified block diagram of a memory including a plurality of flip-flops, an array of memory cells, and a controller communicatively coupled to the plurality of flip-flops, in accordance with an embodiment.

In the description that follows, method 400 is explained with the aid of FIGS. 5 and 6. In particular, FIG. 5 shows a simplified block diagram of an embodiment where a memory 500 includes the plurality of flip-flops 104-1, the array of memory cells 104-2, and a controller 502 communicatively coupled to the plurality of flip-flops 104-1. Furthermore, FIG. 6 shows a simplified representation of data stored in the array of memory cells 104-2 of memory 500, in accordance with an embodiment.

As shown in FIG. 4, method 400 includes storing, in each of a first plurality of memory locations of a memory, an address of another of the first plurality of memory locations (in step 402). In step 402, addresses may be stored in the array of memory cells 104-2 shown in FIG. 5. As depicted in FIG. 6, the array of memory cells 104-2 may be represented as memory locations arranged as N rows and M columns. The memory locations may be divided into two groups, namely a first plurality of memory locations 601 and a second plurality of memory locations 602. In the example of FIG. 6, N memory locations are included in the first plurality of memory locations 601, while N(M−1) memory locations are included in the second plurality of memory locations 602. As depicted in FIG. 6, the memory locations included in the first plurality of memory locations 601 may be different from the memory locations included in the second plurality of memory locations 602. As such, each of the memory locations may belong to the first plurality of memory locations 601 or the second plurality of memory locations 602, but not to both. As an example, in FIG. 6, the memory locations at rows 1 through N of column 1 are included in the first plurality of memory locations 601 (but not in the second plurality of memory locations 602), while the memory locations at rows 1 through N of columns 2 through M are included in the second plurality of memory locations 602 (but not in the first plurality of memory locations 601).

Each of the first plurality of memory locations 601 stores an address of another memory location of the first plurality of memory locations 601. In other words, data read from the first plurality of memory locations 601 includes a memory address that references another memory location included in the first plurality of memory locations 601. As an example, in FIG. 6, the memory location at column 1 and row 1 stores a value 0x00000010 (e.g. indicated in the hexadecimal number system), which includes an address of the memory location at column 1 and row 2. For example, the address of the memory location at column 1 and row 2 may be stored in the lower half word of the value 0x0000010. In like manner, the memory location at column 1 and row 2 stores a value 0x00000020, which includes an address of the memory location at column 1 and row 3. For example, the address of the memory location at column 1 and row 3 may be stored in the lower half word of the value 0x00000020. In the example of FIG. 6, this continues in a similar manner for memory locations at rows 3 through N of column 1. Finally, the memory location at column 1 and row N stores a value 0x00000000, which includes an address of the memory location at column 1 and row 1. For example, the address of the memory location at column 1 and row 1 may be stored in the lower half word of the value 0x00000000. As such, based on the data stored in the first plurality of memory locations 601, a predetermined chain of read operations may be observed. In the example of FIG. 6, the predetermined chain of read operations includes read operations in column 1 and row 1, followed by column 1 and row 2, followed by column 1 and row 3, and so on, until column 1 and row N. The predetermined chain of read operations yields a predetermined sequence of expected data. In the example of FIG. 6, the predetermined sequence of expected data is 0x00000010 (in column 1, row 1), followed by 0x00000020 (in column 1, row 2), and so on, until 0x00000000 (in column 1, row N).

As a result of step 402, at least a portion of data read from a memory location of the first plurality of memory locations 601 can be used as the address for a subsequent read operation. Since the address references another memory location of the first plurality of memory locations 601, the subsequent read operation would again read data from a further memory location of the first plurality of memory locations 601. A portion of the data read from the further memory location can then be used as the address for yet another read operation that would read data from yet another memory location of the first plurality of memory locations 601. As an example, in FIG. 6, a portion (e.g. the lower half word) of the value 0x00000010 read from the memory location at column 1 and row 1 can be used as the address for a subsequent read operation that would access the memory location at column 1 and row 2 and read the value 0x00000020. In turn, a portion (e.g. the lower half word) of the value 0x00000020 read from the memory location at column 1 and row 2 can then be used as the address for yet another read operation that would access the memory location at column 1 and row 3 and read the value stored in the memory location at column 1 and row 3. Likewise, a portion (e.g. the lower half word) of the value 0x00000000 read from the memory location at column 1 and row N can then be used as the address for yet another read operation that would access the memory location at column 1 and row 1 and read the value 0x00000000. Consequently, once an initial address is provided, a continuous read of data from the first plurality of memory locations 601 may be performed, where at least a portion of the data from each read operation is used as the address for the next read operation.

In contrast to the first plurality of memory locations 601, in some embodiments, each of the second plurality of memory locations 602 stores data that does not include an address of another memory location of the array of memory cells 104-2. In such an example, the value stored in each of the second plurality of memory locations 602 may not be in, or may not have a portion that references, a memory address space of the array of memory cells 104-2. Alternatively, or additionally, the second plurality of memory locations 602 may each store a value that includes an address of a protected or forbidden memory block (namely, one or more memory locations of memory 500 which cannot be read from or written to). In the example of FIG. 6, each of the second plurality of memory locations 602 stores a value 0xFFFFFFFF, and neither the lower half word nor the upper half word of the value 0xFFFFFFFF is an address of a memory location of the array of memory cells 104-2.

Referring back to FIG. 4, method 400 proceeds with reading a first address from an address bus signal received at the memory, the first address being an address of a first one of the first plurality of memory locations (in step 404). Referring to FIGS. 5 and 6, at step 404 of method 400, the first address (which may be an address of one of the first plurality of memory locations 601) may be provided to the memory 500 (e.g. to the plurality of flip-flops 104-1 of memory 500) on address bus signal HADDR. Illustratively, the first address may be the address of the memory location at column 1 and row 1 (which is referred to, in this example, as "a first one of the first plurality of memory locations"). In essence, the first address may be used by an initial read operation that accesses and reads data from the array of memory cells 104-2, and this starts a continuous read of data from the array of memory cells 104-2. As illustrated in FIG. 5, the plurality of flip-flops 104-1 samples the first address from the address bus signal HADDR and provides the sampled first address to the array of memory cells 104-2 as the next address to be read (indicated in FIG. 5 as NEXT_ADDR).

Referring back to FIG. 4, method 400 proceeds with reading data stored in the first one of the first plurality of memory locations (in step 406). In this step of method 400, the first address is used by an initial read operation that accesses and reads data from the array of memory cells 104-2. Continuing from the example above, where the first address may be the address of the memory location at column 1 and row 1, at step 406 of method 400, data stored in the memory location at column 1 and row 1 is accessed and read (e.g. the value 0x00000010 is read). As depicted in FIG. 5, the data read from the memory location at column 1 and row 1 is output as read data HRDATA, which is fed back to controller 502 and also output from memory 500.

Referring back to FIG. 4, method 400 proceeds with determining whether the read data includes an address of a further memory location of the first plurality of memory locations (e.g. in a first iteration of step 408). Referring to FIGS. 5 and 6 and continuing from the example above, at this iteration of step 408 of method 400, controller 502 determines whether the read data HRDATA (e.g. the value 0x00000010 read from the memory location at column 1 and row 1) includes an address of a further memory location of the first plurality of memory locations 601 or whether the read data HRDATA (e.g. the value 0x00000010) is expected data in the predetermined chain of read operations (e.g. described above in respect of FIG. 6). In some embodiments, such as in the example of FIG. 6, the address of a further memory location of the first plurality of memory locations 601 may be stored in the lower half word of the read data HRDATA (e.g. the lower half word of the value 0x00000010). In other embodiments, the address of a further memory location of the first plurality of memory locations 601 may be stored in the upper half word of the read data HRDATA. Determining whether the read data HRDATA includes an address of a further memory location of the first plurality of memory locations 601 may be accomplished by controller 502. In some embodiments, the circuitry of controller 502 may be implemented by initially designing controller 502 using a hardware description language (HDL), such as Verilog, as an example. The specific circuitry of controller 502 may depend, at least in part, on the HDL used to design the structure and behavior of controller 502. Continuing from the example above, it is assumed that controller 502 determines that the read data HRDATA (e.g. having value 0x00000010) is expected data in the predetermined chain of read operations or that the read data HRDATA includes an address of a further memory location of the first plurality of memory locations 601 (namely, the address of the memory location at column 1 and row 2).

Referring back to FIG. 4, if the read data HRDATA includes an address of a further memory location of the first plurality of memory locations or if read data HRDATA is expected data in the predetermined chain of read operations, method 400 proceeds with determining whether a read operation is to be performed on data stored in the other memory location of the first plurality of memory locations (in step 410). Referring to FIGS. 5 and 6 and continuing from the example above, at step 410 of method 400, controller 502 determines whether the data stored in the memory location at column 1 and row 2 should be read. As shown in FIG. 5, controller 502 may determine this by monitoring a first control signal CTRL_SIG1 at an input of controller 502 and determining whether the first control signal CTRL_SIG1 is set to a first value or a second value. The first control signal CTRL_SIG1 being set to the first value (e.g. to binary value 1) may be indicative that a read operation is to be performed on data stored in the further memory location of the first plurality of memory locations 601. On the other hand, the first control signal CTRL_SIG1 being set to the second value (e.g. to binary value 0) may be indicative that a read operation is not to be performed on data stored in the further memory location of the first plurality of memory locations 601. In some embodiments, the first control signal CTRL_SIG1 may be a slave designation signal HSEL, which may be a signal used by a master to designate a target slave when the master obtains bus occupation permission (e.g. when a master receives an Advanced Microcontroller Bus Architecture (AMBA) read command). In some embodiments, such as in the example of FIG. 5, the first control signal CTRL_SIG1 (e.g. HSEL) may be generated by decoding the address bus signals HADDR. In an embodiment where the array of memory cells 104-2 includes a PCM array, the first control signal CTRL_SIG1 (e.g. HSEL) may be a PCM input signal provided to the array of memory cells 104-2. As such, the memory 500 may include a decoder 504. Although decoder 504 is shown in FIG. 5 as being separate and distinct from controller 502, in some other embodiments, decoder 504 may be included within controller 502. Continuing from the example above, it is assumed that controller 502 determines that a read operation is to be performed on data stored in the memory location at column 1 and row 2.

Referring back to FIG. 4, if a read operation is to be performed on data stored in the further memory location, method 400 proceeds with reading data stored in the further memory location of the first plurality of memory locations (in step 412). Referring to FIGS. 5 and 6 and continuing from the example above, in some embodiments, at step 412 of method 400, the address of the memory location at column 1 and row 2 is provided by controller 502 to the plurality of flip-flops 104-1 via a second control signal CTRL_SIG2. The plurality of flip-flops 104-1 sample the address provided via the second control signal CTRL_SIG2, and the sampled address is provided to the array of memory cells 104-2 as the next address to be read NEXT_ADDR. In some embodiments, a clock signal for driving the plurality of flip-flops 104-1 is also provided by controller 502 to the plurality of flip-flops 104-2 via the second control signal CTRL_SIG2. In response to receiving the next address to be read NEXT_ADDR, data stored in the memory location at column 1 and row 2 is read (e.g. the value 0x00000020, which is referred to, in this example, as "data stored in the further memory location of the first plurality of memory locations"). The data read from the memory location at column 1 and row 2 is output from memory 500 and the value of read data HRDATA is updated to the value 0x00000020, which is also fed back to controller 502.

Referring back to FIG. 4, after reading data stored in the further memory location (e.g. as in step 412), method 400 proceeds with determining whether the read data includes an address of another of the first plurality of memory locations (e.g. in a second iteration of step 408). Referring to FIGS. 5 and 6 and continuing from the example above, at this iteration of step 408 of method 400, controller 502 determines whether the read data HRDATA (e.g. the value 0x00000020) includes an address of another memory location of the first plurality of memory locations 601. In some embodiments, such as in the example of FIG. 6, the address of another memory location of the first plurality of memory locations 601 may be stored in the lower half word of the read data HRDATA (e.g. the lower half word of the value 0x00000020). In other embodiments, the address of another memory location of the first plurality of memory locations 601 may be stored in the upper half word of the read data HRDATA. Determining whether the read data HRDATA includes an address of another memory location of the first plurality of memory locations 601 may be accomplished by the methods described above in relation to the first iteration of step 408 of method 400. Continuing from the example above, it is assumed that controller 502 determines that the read data HRDATA (e.g. having value 0x00000020) includes an address of a further memory location of the first plurality of memory locations 601 (namely, the address of the memory location at column 1 and row 3). Consequently, the method 400 transitions from step 408 to step 410.

Referring back to FIG. 4, if, in step 410, controller 502 determines that a read operation is not to be performed on data stored in the further memory location, method 400 proceeds with disabling (or suspending) a subsequent read operation and holding an output of the memory (in step 414). In essence, at step 414, no further data is read from the plurality of memory cells 104-2. Controller 502 may provide an indication (e.g. via second control signal CTRL_SIG2) to the plurality of flip-flops 104-1 that no further sampling of addresses is to be performed by the plurality of flip-flops 104-1. In response to receiving the second control signal CTRL_SIG2 having the indication that a subsequent read operation is disabled or suspended, the output of the plurality of flip-flops 104-1 (namely, the next address to be read NEXT_ADDR) and the output of the array of memory cells 104-2 (namely, the read data HRDATA) are held at their current values and not updated. Continuing from the example above, suppose that the read data HRDATA has the value 0x00000020, but that it is determined that a subsequent read operation is not to be performed, read data HRDATA is held at the value 0x00000020, and the data stored at the memory location at column 1 and row 3 is not read.

Referring back to FIG. 4, step 414 may also be reached if it is determined, in step 408, that the read data HRDATA does not include an address of a further memory location of the first plurality of memory locations 601 or if it is determined that read data HRDATA is not expected data in the predetermined chain of read operations. As an example, suppose that the read data HRDATA has a value of 0xFFFFFFFF because a memory or read error occurred and data is read, in step 412, from the second plurality of memory locations 602. In such an example, controller 502 determines, in step 408, that the read data HRDATA, having the value 0xFFFFFFFF, does not include an address of another memory location of the first plurality of memory locations 601 or that the read data HRDATA, having the value 0xFFFFFFFF, is not expected data in the predetermined chain of read operations, and consequently, method 400 transitions from step 408 to step 414, where a subsequent read operation is disabled (or suspended) and the read data HRDATA is held at the value 0xFFFFFFFF.

Referring back to FIG. 4, method 400 proceeds, from step 414, with determining whether a memory error occurred (in step 416). In essence, at this step of method 400, controller 502 determines whether step 414 was reached because a subsequent read operation did not need to be performed (e.g. from step 410) or because the read data HRDATA did not include an address of another memory location of the first plurality of memory locations 601 (e.g. from 408). This may be accomplished by controller 502 reading the read data HRDATA and determining whether the read data HRDATA is in the memory address space of the array of memory cells 104-2 or whether the read data HRDATA is expected data in the predetermined chain of read operations. The read data HRDATA being the expected data in the predetermined chain of read operations or being in the memory address space of the array of memory cells 104-2 may indicate that the read operation at the access time $T_{acc}$ of memory 500 was successful and that the finite state machine (FSM) executing method 400 was stopped because it was determined that a subsequent read operation was not to be performed. On the other hand, the read data HRDATA not being in the memory address space of the array of memory cells 104-2 may indicate that the read operation at the access time $T_{acc}$ of memory 500 was successful and that the FSM executing method 400 was stopped because it was determined that the read data HRDATA did not include an address of another memory location of the first plurality of memory locations 601. As an example, if it was determined that read data HRDATA having the value 0x00000020 includes the address of the memory location at column 1 and row 3 (e.g. from step 408), but that a subsequent read operation is not to be performed (e.g. from step 410), then read data HRDATA has the value 0x00000020. Since the value 0x00000020 is in the memory address space of the array of memory cells 104-2, controller 502 may determine that the read operation at the access time $T_{acc}$ of memory 500 was successful and that the FSM executing method 400 was stopped because it was determined that a subsequent read operation was not to be performed. As another example, if it was determined that read data HRDATA having the value 0xFFFFFFFF does not include an address of another memory location of the first plurality of memory locations 601 (e.g. from step 408), then read data HRDATA has the value 0xFFFFFFFF. Since the value 0xFFFFFFFF is not in the memory address space of the array of memory cells 104-2, controller 502 may determine that the read operation at the access time $T_{acc}$ of memory 500 was not successful and that the FSM executing method 400 was stopped because a memory error occurred.

As described above, method 400 may be used to determine the access time $T_{acc}$ of memory 500. During determination of the access time $T_{acc}$, memory clock signal MCLK is provided to the memory 500 and data stored in the first plurality of memory locations 601 is continuously read and output from memory 500, until a memory error occurs (e.g. the transition from step 408 to step 414) or until memory 500 receives an indication that a subsequent read operation is not to be performed (e.g. the transition from step 410 to step 414). It is noted that at least a portion of the read data HRDATA is used as the address for the next read operation. The read operations may occur at the frequency of memory clock signal MCLK, and the frequency of memory clock signal MCLK can be increased until a memory error is encountered. A memory error occurs when the data read does not include an address of a memory location of the first plurality of memory locations 601. In some embodiments, when a read or memory error occurs, data from the second plurality of memory locations 602 is read (i.e. data that does not address of a memory location of the array of memory cells 104-2). In other embodiments, when a read or memory error occurs, data may be read from the first plurality of memory locations 601, but the read data HRDATA may be different from the predetermined data expected to be read from the sequential read chain. As such, the access time $T_{acc}$ of memory 500 may be, or may be represented by or related to, the smallest period of memory clock signal MCLK that allows data to be read from the first plurality of memory locations 601 without a memory error.

It is noted that in the example shown in FIG. 5, address bus signal HADDR is provided to the plurality of flip-flops 104-1. However, in some other embodiments, such as in the example shown in FIG. 7 (described below), address bus signal HADDR is provided to controller 502 (e.g. a component of controller 502) and controller 502 may be configured to provide a portion the read data HRDATA or the first address on address bus signal HADDR to the plurality of flip-flops 104-1.

Figure 7:
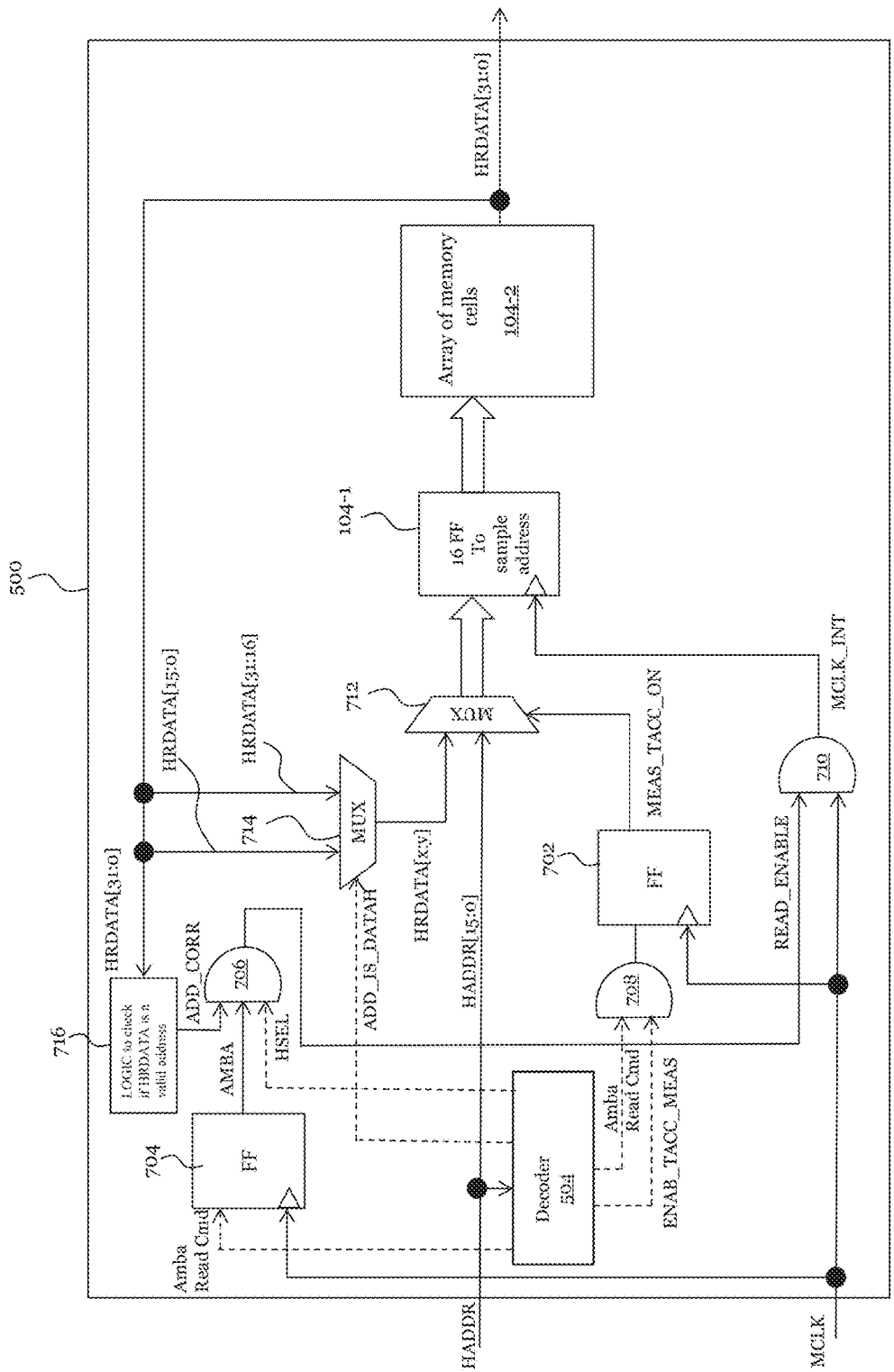
FIG. 7 schematically illustrates a memory, in accordance with an embodiment.

FIG. 7 shows a schematic of the memory 500, in accordance with an embodiment. In comparison with the simplified block diagram shown in FIG. 5, the embodiment of memory 500 shown in FIG. 7 shows that controller 502 includes a second plurality of flip-flops 702, 704; a plurality of logic gates 706, 708, 710 (e.g. AND gates); a plurality of multiplexers 712, 714; and test circuit 716 configured to determine whether read data HRDATA includes an address of another memory location of the first plurality of memory locations 601. As shown in FIG. 7, memory 500 also includes decoder 504, which may also be included in controller 502, in some embodiments.

Memory 500 receives address bus signal HADDR and memory clock signal MCLK as its inputs. Memory 500 outputs read data HRDATA, which is assumed in the example of FIG. 7 to be a 32 bit word. As shown in FIG. 7, decoder 504 receives and decodes address bus signal HADDR, and the decoding of address bus signal HADDR yields information that is needed for the execution of method 400 described above in relation to FIGS. 4 to 6. In particular, the decoding of address bus signal HADDR may yield bits ENAB_TACC_MEAS, Amba Read Cmd, HSEL, and ADD_IS_DATAH, among others. These bits are described in greater detail in the description that follows.

Decoding the address bus signal HADDR may yield a bit ENAB_TACC_MEAS, which may indicate whether method 400 is to be executed. As an example, when bit ENAB_TACC_MEAS is set to binary value 1, controller 502 may determine that method 400 is to be executed. However, when bit ENAB_TACC_MEAS is set to binary value 0, controller 502 may determine that method 400 is not to be executed.

Decoding the address bus signal HADDR may yield a bit Amba Read Cmd, which may indicate whether a master has received an AMBA read command. As an example, when bit Amba Read Cmd is set to binary value 1, then controller 502 may determine that an AMBA high-performance bus (AHB) master (hereinafter referred to as "master") has received an AMBA read command. However, when bit Amba Read Cmd is set to binary value 0, then controller 502 may determine that a master has not received an AMBA read command.

Decoding the address bus signal HADDR may yield signal HSEL, which may be an input signal to a PCM array and which may indicate whether a master has designated a target AHB slave (hereinafter referred to as "slave"). As an example, when signal HSEL is set to binary value 1, then controller 502 may determine that a master has designated a target slave. However, when signal HSEL is set to binary value 0, then controller 502 may determine that a master has not designated a target slave.

The above-described Amba Read Cmd and HSEL bits may be used by controller 502 to determine whether a read operation is to be performed (e.g. in step 410 of method 400). In particular, in some embodiments, an indication that a master has received an AMBA read command and that the master has designated a target slave may be sufficient to determine that a subsequent read operation is to be performed.

Decoding the address bus signal HADDR may yield a bit ADD_IS_DATAH (e.g. a test register bit), which may indicate whether an address is stored in the lower half word or the upper half word of read data HRDATA. As an example, when bit ADD_IS_DATAH is set to binary value 1, then controller 502 may determine that an address is stored in the upper half word of read data HRDATA. However, when bit ADD_IS_DATAH is set to binary value 0, then controller 502 may determine that an address is stored in the lower half word of read data HRDATA.

As shown in FIG. 7, a bit MEAS_TACC_ON (which is the output of flip-flop 702 of the second plurality of flip-flops 702, 704) rises (e.g. set to binary value 1) when an AMBA read is started (e.g. when the bit Amba Read Cmd is set to binary value 1) and when method 400 is to be executed (e.g. when the bit ENAB_TACC_MEAS is set to binary value 1). The bit MEAS_TACC_ON is provided to multiplexer 712 and may be configured to indicate, to multiplexer 712, that an address is to be provided to the plurality of flip-flops 104-1. As an example, when the bit MEAS_TACC_ON is set to binary value 1 (e.g. when both Amba Read Cmd and ENAB_TACC_MEAS are set to binary value 1), the multiplexer 712 may be configured to provide an address to the plurality of flip-flops 104-1. On the other hand, when the bit MEAS_TACC_ON is set to binary value 0 (e.g. when either Amba Read Cmd or ENAB_TACC_MEAS is set to binary value 0), the multiplexer 712 may be configured to not provide an address to the plurality of flip-flops 104-1. In some embodiments, the plurality of flip-flops 104-1 samples the address received from multiplexer 712. In the embodiment shown in FIG. 7, it is assumed that the each of the addresses of the memory locations in the array of memory cells 104-2 is a 16-bit memory address. Consequently, the plurality of flip-flops 104-1 shown in FIG. 7 is depicted as having 16 flip-flops configured to sample the 16-bit memory address.

In relation to method 400, it is assumed that step 402 of method has been performed and that the array of memory cells 104-2 in FIG. 7 stores, in each of the first plurality of memory locations 601 of memory 500, an address of another of the first plurality of memory locations 601. Method 400 proceeds with step 404, where a first address is read from the address bus signal HADDR[15:0]. As described above in relation to FIGS. 4 to 6, the first address is an address of one of the first plurality of memory locations 601. As shown in FIG. 7, the multiplexer 712 receives the address bus signal HADDR[15:0] as well as a portion of read data HRDATA[31:0] (indicated in FIG. 7 as "HRDATA[x:y]"). As such, the address for a read operation is selected between HRDATA[x:y] and address bus signal HADDR[15:0]. The address bus signal HADDR[15:0] is used for the first read (e.g. the first iteration of method 400), while HRDATA[x:y] is used for the read operations following the first read. As such, at step 404 of method 400, the multiplexer 712 selects the address bus signal HADDR[15:0] and provides it to the plurality of flip-flops 104-1. The plurality of flip-flips 104-1 samples the address bus signal HADDR[15:0] and provides the sampled first address to the array of memory cells 104-2. In the example shown in FIG. 7, the plurality of flip-flops 104-1 are driven by clock signal MCLK_INT, which is a duplicate of memory clock signal MCLK when a bit READ_ENABLE is set to binary value 1. In a first iteration of method 400, the bit READ_ENABLE may be set to binary value 1 to allow the initial read operation to proceed so that data stored at the first address may be read.

Method 400 proceeds with step 406, where data stored at the first address is read and output from memory 500 as read data HRDATA[31:0]. As shown in FIG. 7, read data HRDATA[31:0] is also fed back to test circuit 716, which is configured to perform step 408 of method 400, namely, determine whether the read data HRDATA[31:0] includes an address of another memory location of the first plurality of memory locations 601. Although not depicted in FIG. 7, the bit ADD_IS_DATAH (e.g. a test register bit) is also provided to test circuit 716 so that test circuit 716 can read either the lower half word or the upper half word of read data HRDATA[31:0] in order to determine whether the read data HRDATA[31:0] includes an address of another memory location of the first plurality of memory locations 601. As shown in FIG. 7, the result of this determination may be indicated by a bit ADD_CORR, which may be set to binary value 1 in response to a determination that read data HRDATA[31:0] includes an address of another memory location of the first plurality of memory locations 601. Alternatively, bit ADD_CORR may be set to binary value o in response to a determination that read data HRDATA[31:0] does not include an address of another memory location of the first plurality of memory locations 601.

As shown in the schematic of FIG. 7, when bit ADD_CORR is set to binary value 0 (i.e. when read data HRDATA[31:0] does not include an address of another memory location of the first plurality of memory locations 601), the logic gate 706 outputs a binary value o. Consequently, the bit READ_ENABLE is set to binary value 0. When bit READ_ENABLE is set to binary value 0, the output of logic gate 710 (e.g. the clock signal MCLK_INT) is also set to binary value 0, and the plurality of flip-flops 104-1 are not driven to sample an address at its input or to provide a sampled address to the array of memory cells 104-2. As such, a subsequent read operation is disabled and the read data HRDATA[31:0] is held at its current value. This sequence of events may be identified with the transition from step 408 to step 414 of method 400, in which a subsequent read operation is disabled and the output of memory is held at its current value since the read data does not include an address of a further memory location of the first plurality of memory locations 601.

However, as shown in the schematic of FIG. 7, when bit ADD_CORR is set to binary value 1 (i.e. when read data HRDATA[31:0] includes an address of another memory location of the first plurality of memory locations 601), the bit READ_ENABLE is also set to binary value 1 as long as slave designation signal HSEL and bit Amba Read Cmd are each set to binary value 1. When slave designation signal HSEL and bit Amba Read Cmd are each set to binary value 1, this may indicate that a master has received an AMBA read command and that the master has designated a target slave, and thus a read operation is to be performed. On the other hand, when either slave designation signal HSEL or bit Amba Read Cmd is set to binary value 0, this may indicate that a read operation is not to be performed. This sequence of events may be identified with the transition from step 408 to step 410 of method 400, in which it is determined whether a subsequent read operation is to be performed, even when the read data includes an address of a further memory location of the first plurality of memory locations 601.

When all of the bits ADD_CORR, HSEL, and Amba Read Cmd are set to binary value 1, READ_ENABLE is also set to binary value 1. When bit READ_ENABLE is set to binary value 1, the plurality of flip-flops 104-1 are driven by clock signal MCLK_INT, which is a duplicate of memory clock signal MCLK. As such, the plurality of flip-flips 104-1 may sample the address provided at its input and provide the sampled address to the array of memory cells 104-2, which, in turn, reads data stored at the sampled address and outputs the read data HRDATA[31:0] from memory 500. This sequence of events may be identified with the transition from step 410 to step 412 of method 400, in which data stored in the further memory location of the first plurality of memory locations 601 is read.

As shown in FIG. 7, multiplexer 712 receives, at its inputs, first address HADDR[15:0] and the portion of read data HRDATA[x:y]. Multiplexer 712, in turn, provides the plurality of flip-flops 104-1 with either first address HADDR [15:0] or the portion of read data HRDATA[x:y]. As illustrated in FIG. 7, the portion of read data HRDATA[x:y] is provided to multiplexer 712 by multiplexer 714, which receives bit ADD_IS_DATAH. The bit ADD_IS_DATAH indicates whether an address is stored in the lower half word or the upper half word of the read data HRDATA[31:0]. If bit ADD_IS_DATAH is set to binary value 1, this indicates that an address is stored in the upper half word of read data HRDATA[31:0], and multiplexer 714 provides HRDATA [31:16] to multiplexer 712. On the other hand, if bit ADD_IS_DATAH is set to binary value 0, this indicates that an address is stored in the lower half word of read data HRDATA[31:0], and multiplexer 714 provides HRDATA [15:0] to multiplexer 712. As such, HRDATA[x:y] may be HRDATA[15:0] when bit ADD_IS_DATAH is set to binary value 0, or may be HRDATA[31:16] when bit ADD_IS_DATAH is set to binary value 1.

Referring back to FIG. 7, even when bit ADD_CORR is set to binary value 1 (i.e. when read data HRDATA[31:0] includes an address of another memory location of the first plurality of memory locations 601), the bit READ_EN-ABLE may be set to binary value 0 if either slave designation signal HSEL or bit Amba Read Cmd is set to binary value 0. In such a case, the clock signal MCLK_INT is also set to binary value 0, and the plurality of flip-flops 104-1 are not driven to sample an address at its input or to provide a sampled address to the array of memory cells 104-2. As such, a subsequent read operation is disabled and the read data HRDATA[31:0] is held at its current value. This sequence of events may be identified with the transition from step 410 to step 414 of method 400, in which a subsequent read operation is disabled and the output of memory is held at its current value.

Once a subsequent read operation is disabled and the output of memory 500 (e.g. read data HRDATA) is held at its current value, controller 502 (e.g. test circuit 716) may determine whether a memory error has occurred. This may be accomplished by test circuit 716 reading the value of read data HRDATA[31:0] and determining whether it is, or includes an address that is compatible with, a memory address space of memory 500. In response to a determination that the value of read data HRDATA[31:0] is not compatible with a memory address space of memory 500, it may be concluded that the read operation at the access time $T_{acc}$ of memory 50- was not successful and that the determination of the access time $T_{acc}$ was stopped because a memory error occurred. However, in response to a determination is not compatible with a memory address space of memory 500, it may be concluded that the read operation at the access time $T_{acc}$ of memory 500 was successful and that the determination of the access time $T_{acc}$ was stopped because a subsequent read operation was not to be performed. In some other embodiments, test circuit 716 may read the value of read data HRDATA[31:0] and determine if it is equal to the expected data in the predetermined chain of read operations. The expected data in the predetermined chain of read operations can be determined by: determining the number of clock cycles C that have passed since the start of read operations; and comparing the read data HRDATA [31:0] with the data stored in the $C^{th}$ step in the predetermined chain of read operations built in the first plurality of memory locations 601.

Figure 8A:
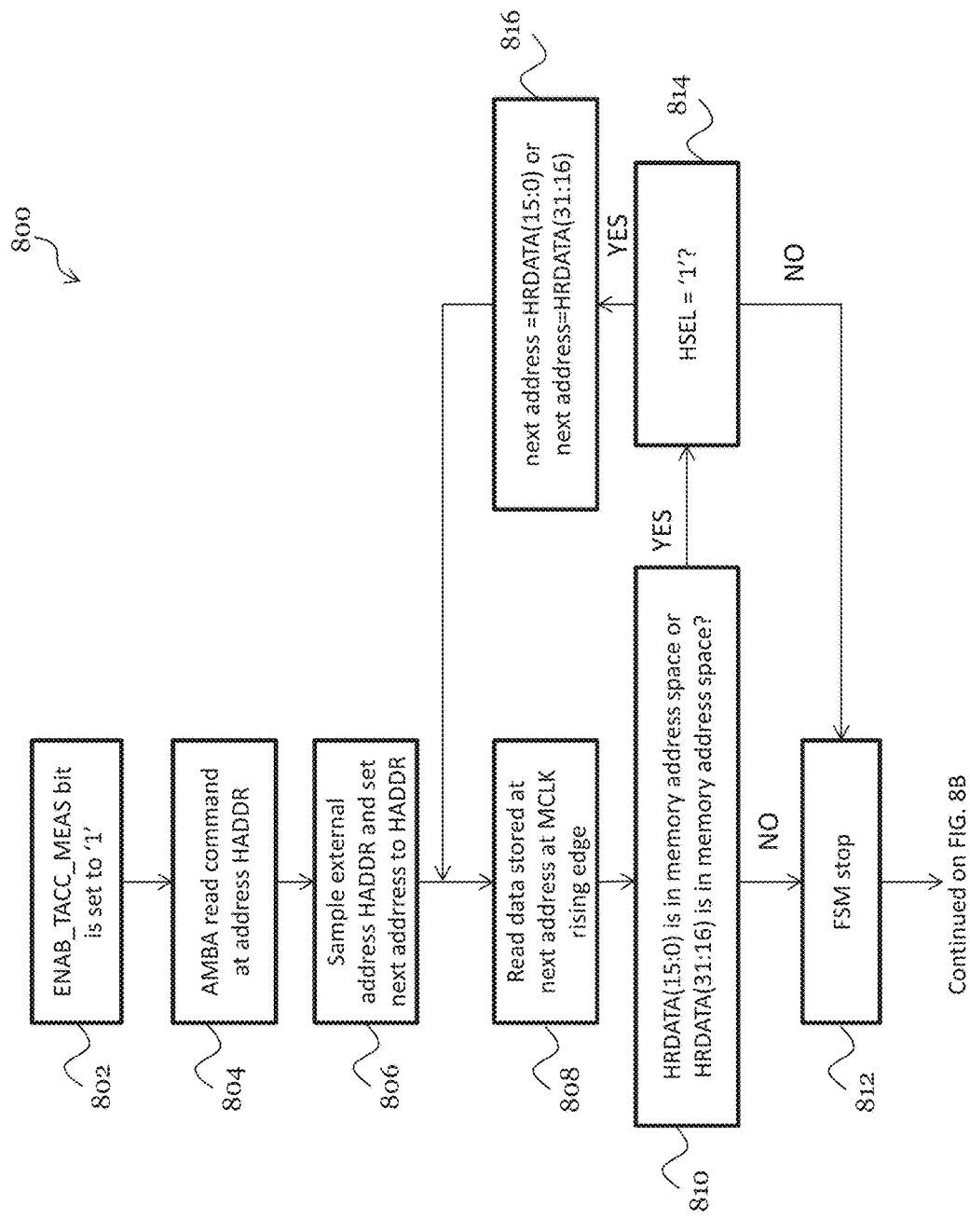
FIGS. 8A and 8B show a flow diagram illustrating a method of determining the access time of the memory shown in FIG. 7, in accordance with an embodiment.
Figure 8B:
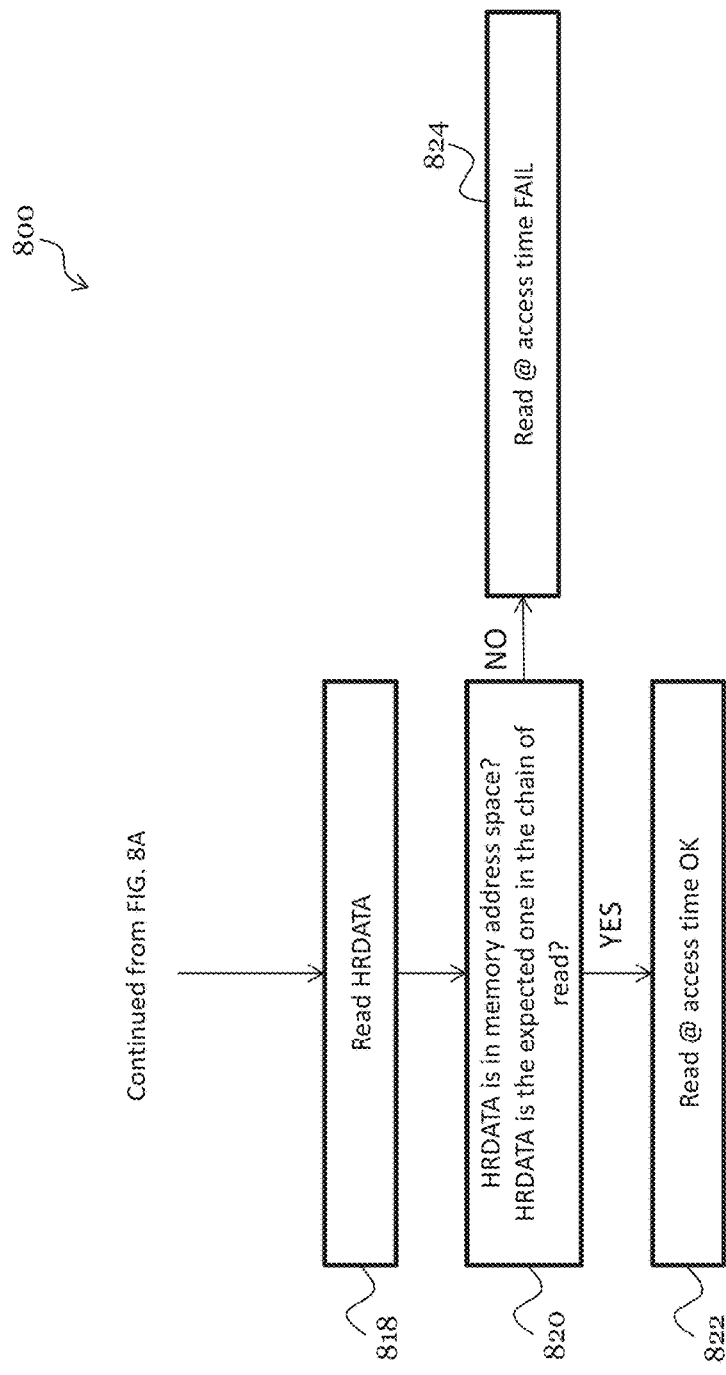

FIGS. 8A and 8B show a flow diagram illustrating a method Boo of determining the access time $T_{acc}$ of the memory 500 shown in FIG. 7, in accordance with an embodiment. In essence, when memory 500 executes method 800 (which is similar to method 400), a simple logic is automatically enabled and continuously reads memory 500, using a portion of read data HRDATA[31:0] (e.g. a half word of HRDATA [31:0]) as the address for the next read. At each clock cycle, a new read is automatically started, using as the next address, a portion of data HRDATA[31:0] that is read from the array of memory cells 104-2. Method 800 stops automatically each time a read operation provides data HRDATA[31:0] that is not compatible with a memory address space of memory 500. If, on the other hand, data HRDATA[31:0] includes an address in the memory address space of memory 500, method 800 continues for the next read operation, unless the signal HSEL indicates that a read operation is not to be performed (in which case, method 800 is stopped).

As shown in FIG. 8A, the method 800 includes enabling memory 500 to determine its access time $T_{acc}$, which may be accomplished by setting the ENAB_TACC_MEAS bit to binary value 1 (in step 802). As described above in respect of FIG. 7, the ENAB_TACC_MEAS bit may be provided on address bus signal HADDR. Method 800 also includes receiving an AMBA read command on address bus signal HADDR (in step 804). In response to receiving the AMRA read command and the setting of the ENAB_TACC_MEAS bit to binary value 1, the determination of access time $T_{acc}$ is enabled, and a read from a parallel advanced high-performance bus (AHB) interface at the array of memory cells 104-2 starts the determination of access time $T_{acc}$. The method 800 proceeds with the address bus signal HADDR being sampled (in step 806), which may be identified with step 404 in method 400. Following this, data stored at the address sampled from address bus signal HADDR is read at the rising edge of memory clock signal MCLK (in step 808). A first iteration of step 808 may be identified with step 406 in method 400.

The read data is output as HRDATA[31:0], and in step 810 of method 800, controller 502 determines whether the read data includes an address in memory address space of the array of memory cells 104-2. Depending on the value of the bit ADD_IS_DATAH, either the lower half word or the upper half word of read data HRDATA[31:0] is read to determine whether the read data includes an address in memory address space of the array of memory cells 104-2. Step 810 of method 800 may be identified with step 408 in method 400.

If read data HRDATA[31:0] does not include an address in memory address space of the array of memory cells 104-2, method 800 proceeds from step 810 to step 812, in which the FSM executing method 800 is stopped. Step 812 of method 800 may be identified with step 414 in method 400. On the other hand, if read data HRDATA[31:0] includes an address in memory address space of the array of memory cells 104-2, method 800 proceeds from step 810 to step 814. At step 814, signal HSEL is sampled to determine whether a continuous read is allowed to proceed. Step 814 of method 800 may be identified with step 410 in method 400.

If signal HSEL is set to binary value 1, then the next address to be sampled is set to either the lower half word or the upper half word of read data HRDATA[31:0] (in step 816), depending on the value of the bit ADD_IS_DATAH, and the data stored at the next address to be sampled is read at the rising edge of memory clock signal MCLK (in step 808). In some embodiments, step 816 may be implemented by updating a memory address register with the next address to be sampled. The combination of step 816 and a further iteration of step 808 may be identified with step 412 in method 400. On the other hand, if signal HSEL is set to binary value 0, then method 800 proceeds from step 814 to step 812, in which the FSM executing method 800 is stopped.

Referring now to FIG. 8B, method 800 proceeds from step 812 to steps 818, 820, 822, and 824, which may collectively be identified with step 416 in method 400. In steps 818 and 820, read data HRDATA[31:0] is read to determine whether it includes an address in memory address space of the array of memory cells 104-2 or whether it is the expected data in the predetermined chain of read operations. If read data HRDATA[31:0] includes an address in memory address space of the array of memory cells 104-2 or if read data HRDATA[31:0] is expected data in the predetermined chain of read operations, then it is determined (e.g. in step 822) that the read operation at the access time $T_{acc}$ of memory 500 was successful and that the FSM executing method 800 was stopped because signal HSEL was set to binary value 0. On the other hand, if read data HRDATA[31:0] does not include an address in memory address space of the array of memory cells 104-2 or if read data HRDATA[31:0] is not expected data in the predetermined chain of read operations, then it is determined (e.g. in step 824) that the read operation at the access time $T_{acc}$ of memory 500 was not successful and that the FSM executing method 800 was stopped because a memory error occurred.

Figure 9A:
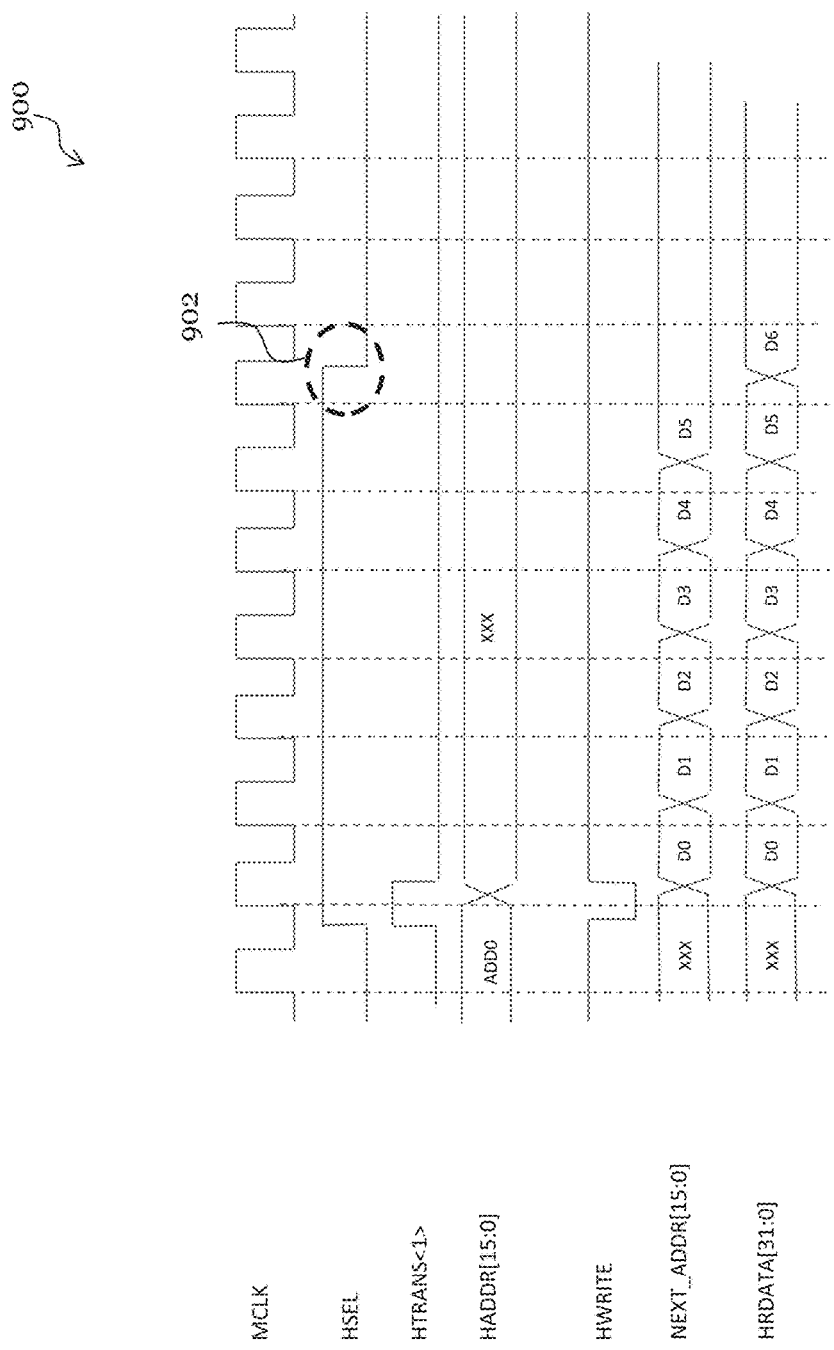
FIG. 9A illustrates a simplified timing diagram showing read data output from a memory during determination of the access time of the memory, in which all read data are compatible with an address space of the memory, in accordance with an embodiment.

FIG. 9A illustrates a simplified timing diagram 900 showing read data HRDATA[31:0] output from memory 500 during determination of the access time $T_{acc}$ of memory 500, in which all read data HRDATA[31:0] are compatible with the memory address space of the array of memory cells 104-2. In the example of FIG. 9A, the determination of the access time $T_{acc}$ is stopped by the HSEL bit being set to binary value 0 (indicated in FIG. 9A as the transition 902).

As shown in FIG. 9A, an initial address ADD0 is provided on address bus signal HADDR. Initial address ADD0 may be identified with the first address on the address bus signal HADDR[15:0] that initiates the continuous read of the memory 500, as described above in relation to methods 400 and 800. In response to signal HSEL being set to binary value 1, method 800 (or equivalently, method 400) is executed in which the first address ADD0 is read from the address bus signal HADDR and the data D0, stored at first address ADD0 of the array of memory cells 104-2, is read and output as HRDATA[31:0] from memory 500. Controller 502 (e.g. test circuit 716) determines that the read data HRDATA[31:0] having value D0 includes an address compatible with the memory address space of the array of memory cells 104-2. Furthermore, since signal HSEL is still set to binary 1 after this determination is made, a subsequent read operation is performed and the next address to be sampled NEXT_ADDR[15:0] is set to D0.

Following this, the data D1, which is stored at the address contained in D0, is read and output as HRDATA[31:0] from memory 500. Controller 502 (e.g. test circuit 716) determines that the read data HRDATA[31:0] having value D1 includes an address compatible with the memory address space of the array of memory cells 104-2. Furthermore, since signal HSEL is still set to binary 1 after this determination is made, a subsequent read operation is performed and the next address to be sampled NEXT_ADDR[15:0] is set to D1.

Following this, the data D2, which is stored at the address contained in D1, is read and output as HRDATA[31:0] from memory 500. Controller 502 (e.g. test circuit 716) determines that the read data HRDATA[31:0] having value D2 includes an address compatible with the memory address space of the array of memory cells 104-2. Furthermore, since signal HSEL is still set to binary 1 after this determination is made, a subsequent read operation is performed and the next address to be sampled NEXT_ADDR[15:0] is set to D2.

Following this, the data D3, which is stored at the address contained in D2, is read and output as HRDATA[31:0] from memory 500. Controller 502 (e.g. test circuit 716) determines that the read data HRDATA[31:0] having value D3 includes an address compatible with the memory address space of the array of memory cells 104-2. Furthermore, since signal HSEL is still set to binary 1 after this determination is made, a subsequent read operation is performed and the next address to be sampled NEXT_ADDR[15:0] is set to D3.

Following this, the data D4, which is stored at the address contained in D3, is read and output as HRDATA[31:0] from memory 500. Controller 502 (e.g. test circuit 716) determines that the read data HRDATA[31:0] having value D4 includes an address compatible with the memory address space of the array of memory cells 104-2. Furthermore, since signal HSEL is still set to binary 1 after this determination is made, a subsequent read operation is performed and the next address to be sampled NEXT_ADDR[15:0] is set to D4.

Following this, the data D5, which is stored at the address contained in D4, is read and output as HRDATA[31:0] from memory 500. Controller 502 (e.g. test circuit 716) determines that the read data HRDATA[31:0] having value D5 includes an address compatible with the memory address space of the array of memory cells 104-2. Furthermore, since signal HSEL is still set to binary 1 after this determination is made, a subsequent read operation is performed and the next address to be sampled NEXT_ADDR[15:0] is set to D5.

Following this, the data D6, which is stored at the address contained in D5, is read and output as HRDATA[31:0] from memory 500. Controller 502 (e.g. test circuit 716) determines that the read data HRDATA[31:0] having value D6 includes an address compatible with the memory address space of the array of memory cells 104-2. However, since signal HSEL is set to binary 0 after this determination is made, a subsequent read operation is not performed and the read data HRDATA[31:0] holds its value at its most recent output, namely, D6. In the example shown in FIG. 9A, the next address to be sampled NEXT_ADDR[15:0] also remains at its most recent output D5.

Figure 9B:
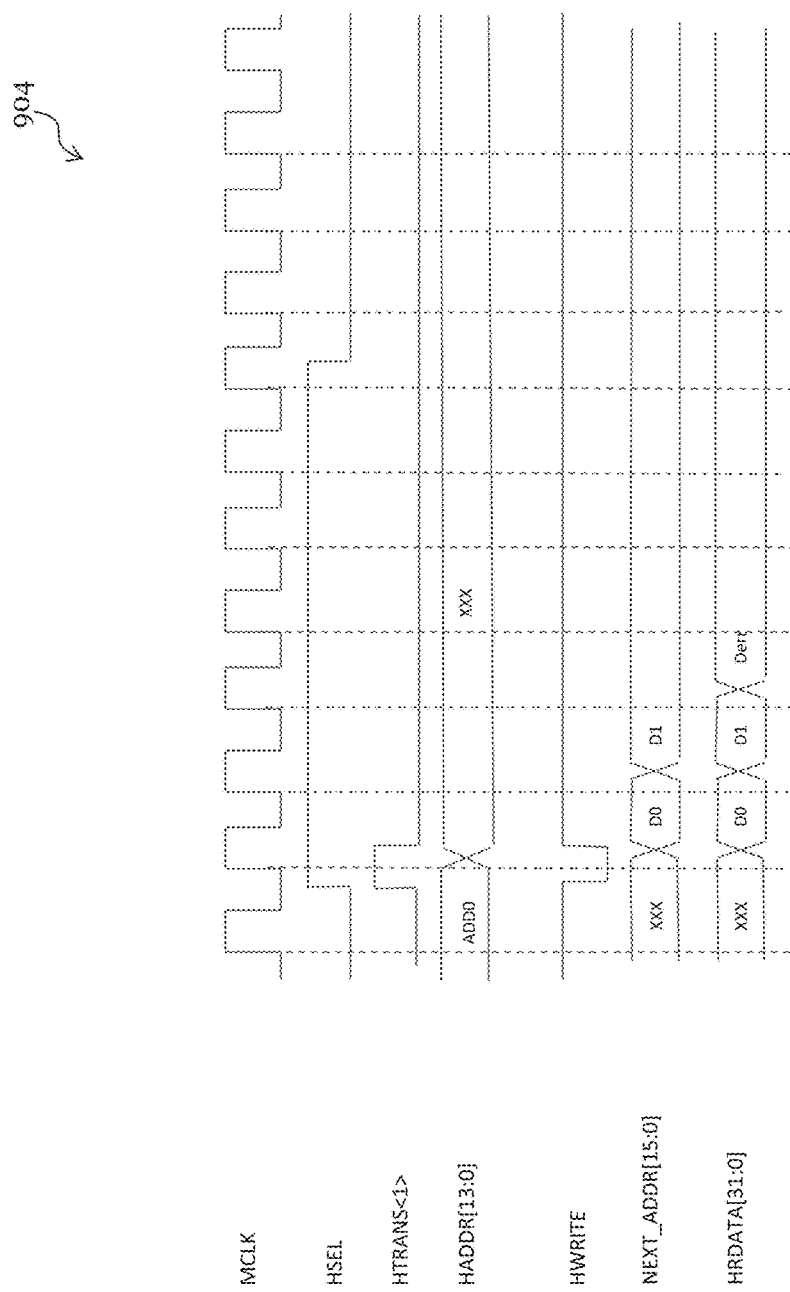
FIG. 9B illustrates a simplified timing diagram showing read data output from a memory during determination of the access time of the memory, in which one or more portions of read data are not compatible with an address space of the memory, in accordance with an embodiment.

FIG. 9B illustrates a simplified timing diagram 904 showing read data HRDATA[31:0] output from memory 500 during determination of the access time $T_{acc}$ of memory 500, in which read data HRDATA[31:0] is not compatible with the memory address space of the array of memory cells 104-2. In the example of FIG. 9B, the determination of the access time $T_{acc}$ is stopped because read data HRDATA[31:0] is not compatible with the memory address space of the array of memory cells 104-2, even though the HSEL input pin (e.g. to the PCM array) is set to binary value 1.

As shown in FIG. 9B, an initial address ADD0 is provided on address bus signal HADDR. In response to signal HSEL being set to binary value 1, method 800 (or equivalently, method 400) is executed in which the first address ADD0 is read from the address bus signal HADDR and the data D0, stored at first address ADD0, is read and output as HRDATA [31:0] from memory 500. Controller 502 (e.g. test circuit 716) determines that the read data HRDATA[31:0] having value D0 includes an address compatible with the memory address space of the array of memory cells 104-2. Furthermore, since signal HSEL is still set to binary 1 after this determination is made, a subsequent read operation is performed and the next address to be sampled NEXT_ADDR [15:0] is set to D0.

Following this, the data D1, which is stored at the address contained in D0, is read and output as HRDATA[31:0] from memory 500. Controller 502 (e.g. test circuit 716) determines that the read data HRDATA[31:0] having value D1 includes an address compatible with the memory address space of the array of memory cells 104-2. Furthermore, since signal HSEL is still set to binary 1 after this determination is made, a subsequent read operation is performed and the next address to be sampled NEXT_ADDR[15:0] is set to D1.

Following this, erroneous data $D_{err}$, stored at an address other than Di is read and output as HRDATA[31:0] from memory 500. This may occur because of a memory error or read error, which occurs when erroneous data $D_{err}$ is not compatible with the memory address space of the array of memory cells 104-2, or if $D_{err}$ is not expected data in the predetermined chain of read operations. Controller 502 (e.g. test circuit 716) determines that the read data HRDATA[31: 0] having value $D_{err}$ does not include an address that is compatible with the memory address space of the array of memory cells 104-2 or that $D_{err}$ is not expected data in the predetermined chain of read operations. Consequently, even though signal HSEL is still set to binary 1 after this determination is made, a subsequent read operation is not performed (due to the memory error) and the read data HRDATA[31:0] holds its value at its most recent output, namely, $D_{err}$. In the example shown in FIG. 9B, the next address to be sampled NEXT ADDR[15:0] remains set at its most recent output D1.

In light of the description given above in respect of FIGS. 9A and 9B, it may be seen that during determination of the access time $T_{acc}$, memory clock signal MCLK is provided to the memory 500 and data stored in the first plurality of memory locations 601 is continuously read and output from memory 500, until a memory error occurs or until memory 500 receives an indication that a subsequent read operation is not to be performed (e.g. by setting signal HSEL to binary value 0). It is noted from FIGS. 9A and 9B that the read operations that produce read data HRDATA[31:0] may occur at the frequency of memory clock signal MCLK. As such, the frequency of memory clock signal MCLK can be increased until a memory error is encountered. The access time $T_{acc}$ of memory 500 may be, or may be represented by or related to, the smallest period of memory clock signal MCLK that allows data to be read from the first plurality of memory locations 601 without a memory error (e.g. without erroneous data $D_{err}$, which is incompatible with the memory address space of the array of memory cells 104-2, being read).

In comparison to traditional methods of determining the access time $T_{acc}$ of a memory (e.g. the method described in relation to FIGS. 1 through 3), the methods and circuits described above in respect of FIGS. 4, 5, 6, 7, 8A, 8B, 9A, and 9B provide a simplified, yet accurate and reliable, determination of access time $T_{acc}$. In particular, the methods and circuits described above in respect of FIGS. 4, 5, 6, 7, 8A, 8B, 9A, and 9B show that there is a single clock source used in the determination (namely, memory clock signal MCLK). As such, there is no need to rely on relative time delays between different clock signals. The limits of the access time $T_{acc}$ may be investigated by merely increasing the frequency of the single clock source (e.g. memory clock signal MCLK) and determining whether a memory error has occurred.

Additionally, the methods and circuits described above in respect of FIGS. 4, 5, 6, 7, 8A, 8B, 9A, and 9B provide a way of determining access time $T_{acc}$ that is embedded in the memory and is independent of external logic. For example, address bus signal HADDR and memory clock signal MCLK are the only external signals provided to memory 500, with all other signals required for the execution of the methods 400 and 800 being generated within the memory. As such, it may be possible to characterize the access time $T_{acc}$ of a memory when the memory is in application or in an end-user product.

Even further, methods 400 and 800 have a stopping criteria based on either the occurrence of a memory error or an indication that a subsequent read operation is not to be performed. As such, in contrast to system 100 and the associated method of determining access time, methods 400 and 800 do not require read data HRDATA to be sampled at a frequency comparable to the frequency of memory clock signal MCLK. Rather, the data outputted from the memory may be sampled and checked at the end of the execution of methods 400 and 800.

In an embodiment, a method may include storing, in each of a first plurality of memory locations of a memory, an address of another of the first plurality of memory locations; reading, from a bus signal received at the memory, an address of a first one of the first plurality of memory locations; reading data stored in the first one of the first plurality of memory locations; and determining, using the read data, whether a read error has occurred.

In an embodiment, a method may include receiving an indication that an access time of a memory is to be determined; sampling, in response to the memory receiving a read command, a first address from a bus signal received at the memory, the first address being an address of a first one of a first plurality of memory locations; and reading data stored at the first one of the first plurality of memory locations. The method may further include determining whether the read data comprises correct data; determining whether a subsequent read operation is to be performed in response to a determination that the read data comprises the correct data; and reading data stored at the address of a further memory location in response to a determination that the subsequent read operation is to be performed.

In an embodiment, a circuit may include a plurality of storage elements configured to store, in each of a first plurality of memory locations, an address of another of the first plurality of memory locations; an address sampling circuit coupled to the plurality of storage elements and configured to provide an address to the plurality of storage elements; and a controller coupled to the plurality of storage elements and the address sampling circuit, the controller configured to control an operation of the address sampling circuit based on a determination of whether a read error has occurred.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The devices and processing systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a digital signal processor (DSP), an Application Specific Integrated Circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of determining memory access time of an array of memory cells, the method comprising:
    providing an array of memory cells triggered by a clock signal, the array of memory cells comprising a first plurality of memory locations and a second plurality of memory locations, wherein each of the first plurality of memory locations is configured to store an address of another one of the first plurality of memory locations, and wherein each of the second plurality of memory locations is configured to store an address of a protected memory block that cannot be read from or that cannot be written to;
    setting a frequency of the clock signal to a first frequency;
    performing the following steps for the first frequency of the clock signal:
        performing an initial read operation on the first plurality of memory locations, the initial read operation comprising:
            reading, from a bus signal received at the array of memory cells, an initial address of a first one of the first plurality of memory locations; and
            reading data stored in the first one of the first plurality of memory locations based on the initial address, wherein at least a portion of the data stored in the first one of the first plurality of memory locations comprises an address of a second one of the first plurality of memory locations;

designating the address of the second one of the first plurality of memory locations as an address of a next one of the first plurality of memory locations to be read; and performing at least one subsequent read operation on the first plurality of memory locations following the initial read operation, wherein addresses of the first plurality of memory locations read during the at least one subsequent read operation are obtained directly from data read from the first plurality of memory locations, wherein the at least one subsequent read operation comprises:

reading data stored in the next one of the first plurality of memory locations to be read; and determining, using the data read from the next one of the first plurality of memory locations, whether a read error has occurred, wherein at least a portion of the data read from the next one of the first plurality of memory locations comprising an address of a further one of the first plurality of memory locations is indicative that the read error has not occurred, and wherein at least a portion of the data read from the next one of the first plurality of memory locations comprising an address of the second plurality of memory locations is indicative that the read error has occurred;

increasing the first frequency of the clock signal in response to a determination that a read error has not occurred; and repeating, in sequence, the initial read operation, the designating the address of the second one of the first plurality of memory locations, the at least one subsequent read operation, and the increasing the first frequency of the clock signal until an occurrence of the read error in order to determine the memory access time.

2. The method of claim 1, wherein determining, using the data read from the next one of the first plurality of memory locations, whether the read error has occurred comprises determining whether the data read from the next one of the first plurality of memory locations is an expected data in a predetermined chain of read operations.

3. The method of claim 1, wherein determining, using the data read from the next one of the first plurality of memory locations, whether the read error has occurred comprises determining whether the data read from the next one of the first plurality of memory locations includes the address of the further one of the first plurality of memory locations.

4. The method of claim 3, wherein the data read from the next one of the first plurality of memory locations includes the address of the further one of the first plurality of memory locations, and wherein the method further comprises determining whether a further iteration of the at least one subsequent read operation is to be performed on data stored in the further one of the first plurality of memory locations.

5. The method of claim 4, wherein the further iteration of the at least one subsequent read operation is to be performed, and wherein the method further comprises:

reading data stored in the further one of the first plurality of memory locations; and determining whether the data read from the further one of the first plurality of memory locations includes an address of another memory location of the first plurality of memory locations or whether the data read from the further one of the first plurality of memory locations is an expected data in a predetermined chain of read operations.

6. The method of claim 4, wherein the further iteration of the at least one subsequent read operation is not to be performed, and wherein the method further comprises:

disabling a subsequent read operation of the at least one subsequent read operation; and holding an output of the memory.

7. The method of claim 4, wherein determining whether the further iteration of the at least one subsequent read operation is to be performed comprises:

determining whether a master component has received a read command; and determining whether the master component has designated a slave component.

8. The method of claim 7, wherein the further iteration of the at least one subsequent read operation is to be performed in response to a determination that the master component has received the read command and a determination that the master component has designated the slave component.

9. The method of claim 7, wherein the read command comprises an Advanced Microcontroller Bus Architecture (AMBA) read command.

10. The method of claim 3, wherein the data read from the next one of the first plurality of memory locations does not include the address of the further one of the first plurality of memory locations, and wherein the method further comprises:

disabling a subsequent read operation of the at least one subsequent read operation in response to a determination that data read from the next one of the first plurality of memory locations does not include the address of the further one of the first plurality of memory locations; and holding an output of the memory.

11. The method of claim 3, wherein the address of the further one of the first plurality of memory locations is stored in an upper half word or a lower half word of the data read from the next one of the first plurality of memory locations.

12. A method of determining memory access time of a memory, the method comprising:

receiving an indication that an access time of a memory is to be determined, the memory comprising a first plurality of memory locations and a second plurality of memory locations, wherein each of the first plurality of memory locations is configured to store an address of another one of the first plurality of memory locations, and wherein each of the second plurality of memory locations is configured to store an address of a protected memory block that cannot be read from or that cannot be written to;

setting a frequency of a clock signal triggering the memory to a first frequency;

performing the following sampling, determining, and reading steps for the first frequency of the clock signal:

sampling, in response to the memory receiving a read command, a first address from a bus signal received at the memory, the first address being an address of a first one of the first plurality of memory locations;

reading data stored at the first one of the first plurality of memory locations, wherein at least a portion of the data stored at the first one of the first plurality of memory locations comprises an address of a further memory location of the memory;

determining whether the data read from the first one of the first plurality of memory locations comprises correct data;

determining whether a subsequent read operation is to be performed in response to a determination that the data read from the first one of the first plurality of memory locations comprises the correct data;

reading data stored at the address of a further memory location in response to a determination that the subsequent read operation is to be performed; and determining whether the data read from the further memory location comprises an address within the first plurality of memory locations or an address within the second plurality of memory locations;

increasing the first frequency of the clock signal in response to a determination that the data read from the further memory location comprises the address within the first plurality of memory locations; and repeating, the sampling, determining, and reading steps and the increasing the first frequency of the clock signal until the data read from the further memory location comprises an address within the second plurality of memory locations in order to determine the memory access time.

13. The method of claim 12, wherein determining whether the read data comprises correct data comprises determining whether the read data comprises an address of a further memory location of the first plurality of memory locations.

14. The method of claim 13, further comprising receiving an indication whether the address of the further memory location is comprised in an upper half word or a lower half word of the read data.

15. The method of claim 13, further comprising:
disabling a further read operation in response to a determination that the read data does not comprise the address of the further memory location.

16. The method of claim 12, wherein determining whether the read data comprises correct data comprises determining whether the read data is an expected data in a predetermined chain of read operations.

17. The method of claim 16, wherein determining whether the read data is the expected data in the predetermined chain of read operations comprises:
determining a number of clock cycles between commencement of a continuous read operation on the memory and reading the data stored at the first one of the first plurality of memory locations;
determining a stored data stored at a memory location of the memory to be accessed at the determined number of clock cycles; and
comparing the read data to the stored data.

18. A circuit, comprising:
a plurality of storage elements configured to store, in each of a first plurality of memory locations, an address of another of the first plurality of memory locations, and to store, in each of a second plurality of memory locations, an address of a protected memory block that cannot be read from or that cannot be written to;
an address sampling circuit coupled to the plurality of storage elements and configured to provide an address to the plurality of storage elements; and
a controller coupled to the plurality of storage elements and the address sampling circuit, the controller configured to control an operation of the address sampling circuit based on a determination of whether a read error has occurred, wherein the controller is configured to:

set a frequency of a clock signal triggering the plurality of storage elements to a first frequency;
perform the following steps for the first frequency of the clock signal:
perform an initial read operation on the first plurality of memory locations, the initial read operation comprising:
reading, from a bus signal received at the plurality of storage elements, an initial address of a first one of the first plurality of memory locations; and
reading data stored in the first one of the first plurality of memory locations based on the initial address, wherein at least a portion of the data stored in the first one of the first plurality of memory locations comprises an address of a second one of the first plurality of memory locations;
designating the address of the second one of the first plurality of memory locations as an address of a next one of the first plurality of memory locations to be read; and
performing at least one subsequent read operation on the first plurality of memory locations following the initial read operation, wherein addresses of the first plurality of memory locations read during the at least one subsequent read operation are obtained directly from data read from the first plurality of memory locations, wherein the at least one subsequent read operation comprises:
reading data stored in the next one of the first plurality of memory locations to be read; and
determining, using the data read from the next one of the first plurality of memory locations, whether a read error has occurred, wherein at least a portion of the data read from the next one of the first plurality of memory locations comprising an address of a further one of the first plurality of memory locations is indicative that the read error has not occurred, and wherein at least a portion of the data read from the next one of the first plurality of memory locations comprising an address of the second plurality of memory locations is indicative that the read error has occurred;
increase the first frequency of the clock signal in response to a determination that a read error has not occurred; and
repeat, in sequence, the initial read operation, the designating the address of the second one of the first plurality of memory locations, the at least one subsequent read operation, and the increasing the first frequency of the clock signal until an occurrence of the read error in order to determine a memory access time of the plurality of storage elements.

19. The circuit of claim 18, wherein the controller is configured to receive a first address from an address bus signal and to provide the first address to the plurality of storage elements for an initial read operation, the first address being an address of a first one of the first plurality of memory locations.

20. The circuit of claim 18, wherein the determination of whether the read error has occurred comprises a determination of whether a data read from the plurality of storage elements comprises an address of a further memory location of the first plurality of memory locations.

21. The circuit of claim 20, wherein the data read from the plurality of storage elements comprises the address of the further memory location of the first plurality of memory locations, and wherein the controller is configured to provide the address of the further memory location to the plurality of storage elements for a subsequent read operation.

22. The circuit of claim 21, wherein the controller is further configured to determine whether the subsequent read operation is to be performed.

23. The circuit of claim 18, wherein the determination of whether the read error has occurred comprises a determination of whether read data is an expected data in a predetermined chain of read operations.

\* \* \* \* \*